United States Patent
Meyer et al.

(10) Patent No.: US 10,656,312 B2
(45) Date of Patent: May 19, 2020

(54) INSULATED GLAZING UNITS AND MICROOPTICAL LAYER INCLUDING MICROSTRUCTURED ANISOTROPIC DIFFUSER AND METHODS

(71) Applicant: 3M INNOVATIVE PROPERTIES COMPANY, St. Paul, MN (US)

(72) Inventors: Justin P. Meyer, Oakdale, MN (US); Martin B. Wolk, Woodbury, MN (US); Thomas R. Hoffend, Jr., San Ramon, CA (US); Steven J. McMan, Stillwater, MN (US); Daniel W. Hennen, Cottage Grove, MN (US); Evan L. Schwartz, Vadnais Heights, MN (US); Michael Benton Free, Stillwater, MN (US); Manoj Nirmal, St. Paul, MN (US); Bing Hao, Woodbury, MN (US); John F. Reed, North Oaks, MN (US); Charles A. Marttila, Shoreview, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 214 days.

(21) Appl. No.: 15/737,362

(22) PCT Filed: Jun. 22, 2016

(86) PCT No.: PCT/US2016/038716
§ 371 (c)(1),
(2) Date: Dec. 18, 2017

(87) PCT Pub. No.: WO2017/003787
PCT Pub. Date: Jan. 5, 2017

(65) Prior Publication Data
US 2018/0164475 A1    Jun. 14, 2018

Related U.S. Application Data

(60) Provisional application No. 62/186,783, filed on Jun. 30, 2015.

(51) Int. Cl.
*G02B 5/02* (2006.01)
*F21S 11/00* (2006.01)
(Continued)

(52) U.S. Cl.
CPC .............. *G02B 5/0257* (2013.01); *B32B 7/12* (2013.01); *B32B 17/10577* (2013.01);
(Continued)

(58) Field of Classification Search
CPC ..................................................... F21S 11/007
See application file for complete search history.

(56) References Cited

U.S. PATENT DOCUMENTS

| 4,472,480 A | 9/1984 | Olson |
| 4,567,073 A | 1/1986 | Larson |

(Continued)

FOREIGN PATENT DOCUMENTS

| CA | 2598729 | 2/2009 |
| WO | WO 2000-48037 | 8/2000 |

(Continued)

OTHER PUBLICATIONS

Luminit, "Diffuser: Light Shaping", Gholographic Company, 2015, [retrieved from the internet on Jun. 29, 2015], URL <www.genuineholographics.com>, 15 pages.
(Continued)

*Primary Examiner* — Christopher E Mahoney
(74) *Attorney, Agent, or Firm* — Clifton F. Richardson

(57) ABSTRACT

Microoptical layers, glazing units including the microoptical layers, and transfer tapes that may be used to provide the microoptical layers are provided. The transfer tape includes
(Continued)

a removable template layer having a structured surface, a backfill layer having a first surface disposed on at least a portion of the structured surface of the template layer, and a microstructured surface opposite the structured surface. The microstructured surface together with a layer disposed on the microstructured surface is an anisotropic diffuser.

24 Claims, 14 Drawing Sheets

(51) Int. Cl.
  *B32B 7/12* (2006.01)
  *B32B 17/10* (2006.01)
  *F21V 3/04* (2018.01)
(52) U.S. Cl.
  CPC ............ *F21S 11/007* (2013.01); *F21V 3/049* (2013.01); *G02B 5/0221* (2013.01); *G02B 5/0231* (2013.01); *G02B 5/0278* (2013.01); *B32B 2419/00* (2013.01)

(56) References Cited

U.S. PATENT DOCUMENTS

| | | | |
|---|---|---|---|
| 4,614,667 A | 9/1986 | Larson | |
| 5,175,030 A | 12/1992 | Lu | |
| 5,183,197 A | 2/1993 | Howe | |
| 5,691,846 A | 11/1997 | Benson, Jr. | |
| 6,858,253 B2 | 2/2005 | Williams | |
| 7,328,638 B2 | 2/2008 | Gardiner | |
| 7,350,442 B2 | 4/2008 | Ehnes | |
| 7,947,376 B2 | 5/2011 | Sherman | |
| 8,647,510 B2 | 2/2014 | Kolb | |
| 8,657,472 B2 | 2/2014 | Aronson | |
| 8,765,881 B2 | 7/2014 | Hays | |
| 8,888,333 B2 | 11/2014 | Yapel | |
| 9,970,614 B2 * | 5/2018 | Meyer | E06B 3/67 |
| 2005/0118352 A1 | 6/2005 | Suwa | |
| 2007/0212535 A1 | 9/2007 | Sherman et al. | |
| 2008/0118662 A1 | 5/2008 | Yang et al. | |
| 2010/0104807 A1 | 4/2010 | Chiu | |
| 2010/0151207 A1 | 6/2010 | Hansen | |
| 2011/0280004 A1 * | 11/2011 | Shimada | G02B 3/0056 362/97.1 |
| 2014/0021492 A1 | 1/2014 | Wolk | |
| 2014/0175707 A1 | 6/2014 | Wolk | |
| 2014/0178646 A1 | 6/2014 | Wolk | |
| 2014/0308801 A1 | 10/2014 | Lee et al. | |
| 2017/0248742 A1 * | 8/2017 | Nirmal | G02B 5/0215 |

FOREIGN PATENT DOCUMENTS

| | | |
|---|---|---|
| WO | WO 02-094960 | 11/2002 |
| WO | WO 2012-082536 | 6/2012 |
| WO | WO 2014-081693 | 5/2014 |
| WO | WO 2016-099600 | 6/2016 |

OTHER PUBLICATIONS

Shaw, "Negative Photoresists for Optical Lithography", IBM Journal of Research and Development, 1997, vol. 41, No. 1/2, pp. 81-94.
International Search Report for PCT International Application No. PCT/US2016/038716, dated Oct. 4, 2016, 3 pages.

* cited by examiner

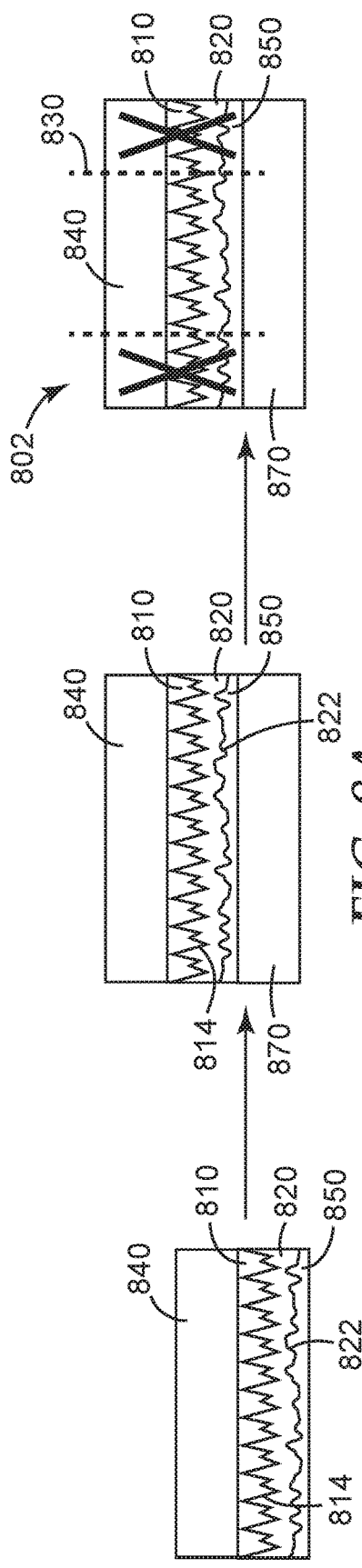
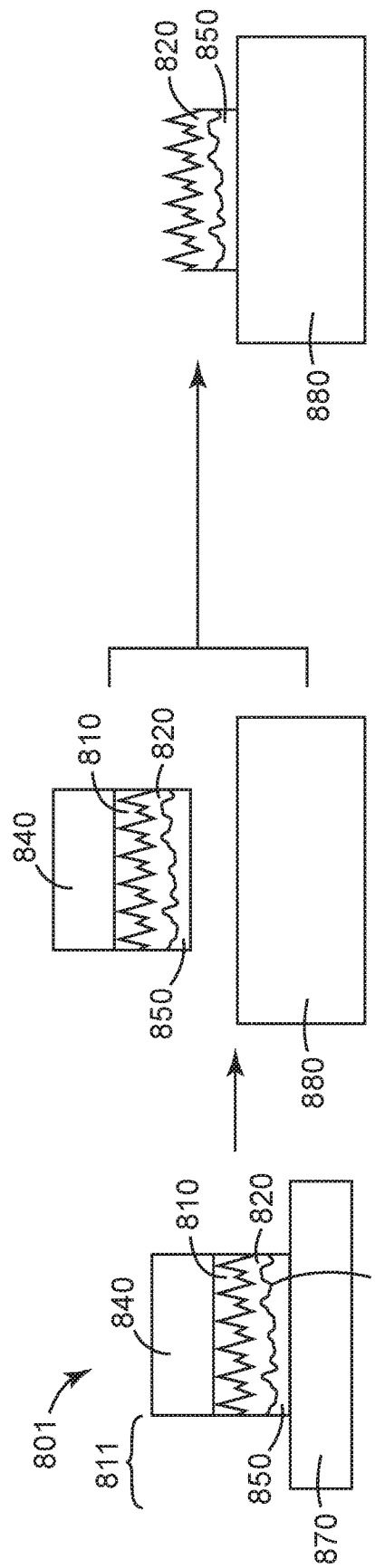
FIG. 8A
FIG. 8B

INSULATED GLAZING UNITS AND MICROOPTICAL LAYER INCLUDING MICROSTRUCTURED ANISOTROPIC DIFFUSER AND METHODS

BACKGROUND

Insulated Glazing Units (IGUs) are used to reduce thermal loss through architectural exterior wall windows. A typical IGU includes two panes, a spacer frame, and a cavity formed by these three elements. Microoptical elements integrated into an IGU can be used to redirect some of the sunlight passing through the IGU to an interior ceiling, to augment conventional interior lighting, thereby increasing the energy efficiency of buildings. In many cases, it can be convenient to integrate the microoptical elements directly on the glass of the window, e.g., by applying refractive or diffractive optical structures to the surface of the glass such as within the cavity of an IGU such as described in US 2014/0021492 (Wolk et al.) and US 2014/0178646 (Wolk et al.).

SUMMARY

In some aspects of the present description, a transfer tape including a removable template layer having a structured surface; a backfill layer having a first surface disposed on at least a portion of the structured surface of the template layer and a second surface opposite the structured surface, the second surface including a microstructured surface; and a layer disposed on at least a portion of the microstructured surface is provided. The layer has a refractive index that differs from the backfill layer, and the microstructured surface together with the layer disposed on at least a portion of the microstructured surface is an anisotropic diffuser.

In some aspects of the present description, a microoptical glazing including a pane of glass having a major surface; a microoptical layer bonded to at least a portion of the major surface, the microoptical layer including a cured backfill layer, the microoptical layer having a structured surface and opposing microstructured surface; and a layer adjacent the microstructured surface having a refractive index that differs from the backfill layer is provided. The microstructured surface together with the layer adjacent the microstructured surface is an anisotropic diffuser.

In some aspects of the present description, a microoptical glazing including a pane of glass having a major surface; a microoptical layer bonded to at least a portion of the major surface; and a microstructured interface adjacent a layer having a different refractive index is provided. The microstructured interface is proximate the microoptical layer. For an input angle ranging from 30° to 60° the microoptical glazing redirects upwards at least 80% of daylight and does not exhibit a solar column. The microstructured interface comprises asymmetric structures and is adapted to anisotropically diffuse visible light.

In some aspects of the present description, an insulated glazing unit including a pane of glass having a sun-facing pane exterior surface separated by a gap from a pane of glass having a room-facing exterior surface, each pane having an interior surface adjacent the gap; and a microoptical layer bonded to at least a portion of an interior surface of a pane of glass is provided. The microoptical layer includes a cured backfill layer, and the microoptical layer has a structured surface and an opposing microstructured surface adjacent a layer having a refractive index that differs from the backfill layer. The microstructured surface together with the layer is an anisotropic diffuser.

Methods of making transfer tapes, microoptical glazings, and insulated glazing units are also described.

BRIEF DESCRIPTION OF THE DRAWINGS

FIG. 8A is a schematic process flow diagram of forming a scored transfer film;

FIG. 8B is a schematic process flow diagram of forming patterned microoptical glazing;

The figures are not necessarily to scale. Like numbers used in the figures refer to like components.

DETAILED DESCRIPTION

Daylight redirecting microoptics integrated into an Insulated Glazing Unit (IGU), for example, can be used to redirect some of the sunlight passing through the IGU to an interior ceiling. Daylight redirecting microoptics redirects most of the sunlight upwards. However, a fraction of the light can go downwards, causing glare. Particularly when the (e.g. prismatic) structures are linear and oriented horizontally, the incoming rays are refracted/reflected mainly in the vertical direction. Sunlight is highly collimated with about a 0.5 degree spread and appears as a solar disk. The effect of the daylight redirecting film is to spread this light vertically forming what is referred to as a "solar column".

Both the total fraction of downward directed light and brightness of the solar column contribute to glare. The use of a microstructured anisotropic diffuser layer, as described herein, reduces glare by diminishing the visibility of the solar column, while still redirecting at least 80% of the light upwards for input angles ranging from 30 to 60 degrees.

Figure 1A:
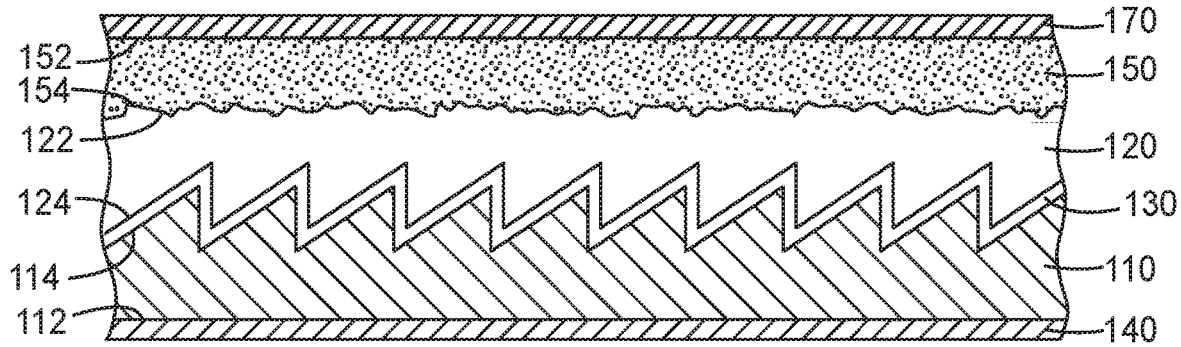
FIG. 1A-1C show a schematic cross-sectional views of transfer tapes.

FIG. 1A shows a schematic cross-sectional view of an embodied transfer tape 100. Transfer tape 100 includes a template layer 110 having a structured surface 114 and a backfill layer 120 disposed on at least a portion of the template layer 110. The template layer 110 is typically capable of being removed from the backfill layer 120. The backfill layer 120 comprises a microstructured surface 122 opposite structured surface 114. The backfill layer 120 includes a major (transfer structured) surface 124 disposed adjacent to, conforming with structured surface 114. In other words, transfer structured surface 124 of the backfill layer is generally a negative replication of structure surface 114 of the template layer. In many embodiments described herein, the transfer tape 100 further includes a layer 150 disposed adjacent microstructured surface 122 having a refractive index that differs from backfill layer 120. In typical embodiments, the difference in refractive index between the backfill layer and the (e.g. adhesive) layer adjacent the microstructured layer is at least 0.05 or 0.10. The microstructured surface together with the adjacent layer functions as an anisotropic diffuser. In typical embodiments, layer 150 is an adhesive capable of adhering to a receptor substrate, such as glass surface. In some embodiments, the layer disposed on the microstructured layer is an optical adhesive layer. The (e.g. adhesive) layer 150 may be disposed as a continuous layer on the microstructured surface. Alternatively, the adhesive layer may be patterned as described in US2014/017646 and depicted for example in FIGS. 1B and 2D.

The diffuser formed from the microstructured surface together with the adjacent layer is preferably an anisotropic diffuser. The anisotropic diffuser may also be described in terms of the microstructured interface between the backfill layer and the layer adjacent the microstructured surface of the backfill layer. A microstructured interface may be adapted to anisotropically diffuse visible light. As used herein, an anisotropic or asymmetric diffuser is a diffuser that is adapted to anisotropically diffuse visible light. An anisotropic diffuser is more diffusive in a first direction than in a second direction different from the first direction.

Transfer tape 100 can include an optional carrier film 140 disposed on a planar surface 112 of the template layer 110, opposite the structured surface 114. The optional carrier film 140 can be useful for supporting the template layer 110 during transport and subsequent fabrication steps, and in some cases can be used during the fabrication of the template layer 110. In some cases, the optional carrier film 140 can be bonded to the template layer 110 such that the two layers are not easily separated. The transfer tape 100 can still further include an optional release liner 170 disposed opposite the optional carrier film 140 and sandwiching the other layers, particularly (e.g. adhesive) layer 150 of the transfer tape 100 therebetween.

In one particular embodiment, an optional transfer layer 130 can be disposed on and conforming to the template structured surface 114 of the template layer 110, such that the optional transfer layer 130 facilitates the separation of structured surface 114 from the transfer structured surface 124. The optional transfer layer 130 can comprise a transfer release coating.

Figure 1B:
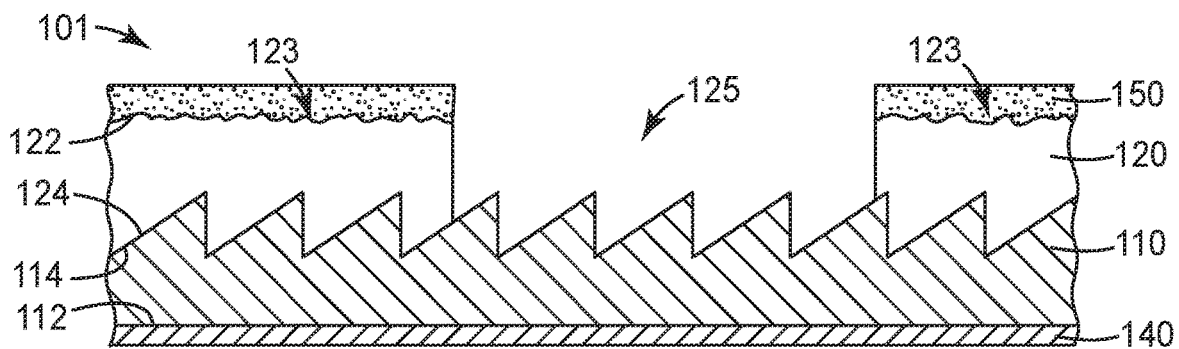

FIG. 1B shows a schematic cross-sectional view of a transfer tape 101. Each of the elements shown in FIG. 1B correspond to like-numbered elements shown in FIG. 1A, which have been described previously. The backfill layer 120 is disposed in a pattern on the template layer 110, such that a first portion 123 of the transfer tape 101 having a backfill layer 120 is positioned adjacent to a second portion 125 that lacks a backfill layer 120. The pattern formed by the first and second portions 123, 125, of the transfer tape 101 can comprise a plurality of islands, lines, or a combination of islands and lines that extend over the surface of the transfer tape 101, and can further comprise a gradient in areal density from one end of the transfer tape 101 to an opposing end, as subsequently described.

Figure 1C:
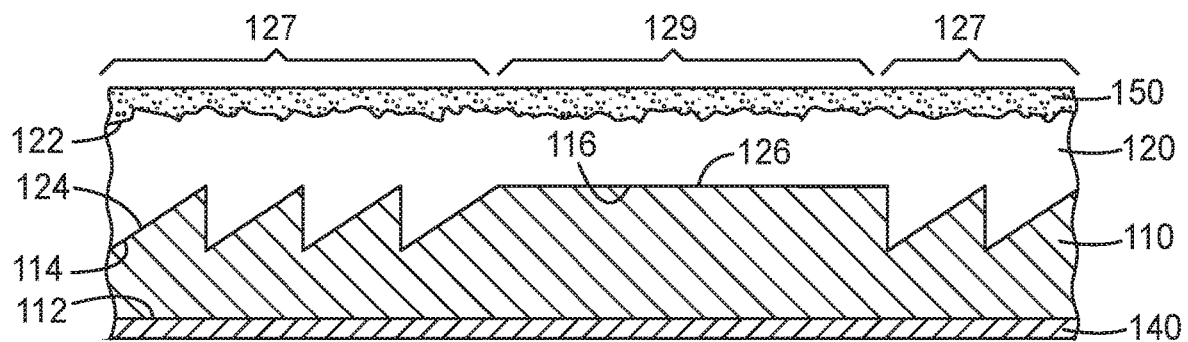

FIG. 1C shows a schematic cross-sectional view of a transfer tape 102. Each of the elements shown in FIG. 1C correspond to like-numbered elements shown in FIG. 1A, which have been described previously. In FIG. 1C, transfer tape 102 includes a template layer 110 having a structured surface 114 including planar regions 116, and a backfill layer 120 including a transfer structured surface 124 including transfer planar regions 126 disposed adjacent to, and following the contours of, the structured surface 114 with planar regions 116 of template layer 110, respectively. The transfer tape 102 includes a first portion 127 having structured surface 114, 124, and an adjacent second portion 129 having planar regions 116, 126, that are disposed in a pattern. The pattern formed by the first and second portions 127, 129, of the transfer tape 102 can comprise a plurality of islands, lines, or a combination of islands and lines that extend over the surface of the transfer tape 102, and can further comprise a gradient in areal density from one end of the transfer tape 102 to an opposing end. The patterned backfill layer of FIGS. 1B and 1C comprise microstructure surface 122 and adjacent (e.g. adhesive) layer 150 that function as a diffusive layer. The patterned backfill layer may optionally further comprise a transfer layer disposed on and conforming to the template structured surface 114 of the template layer 110 and/or optional release liner 170.

FIGS. 2A-2D show schematic cross-sectional views of microoptical glazings.

Figure 2A:
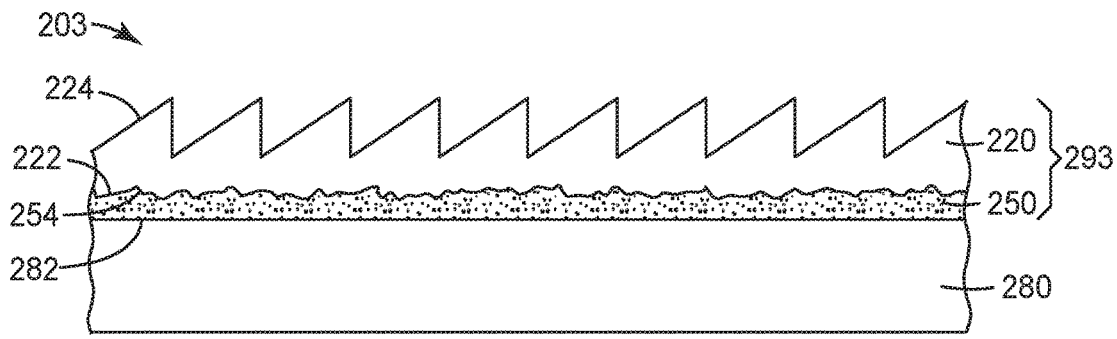
FIGS. 2A-2D show schematic cross-sectional views of microoptical glazings.

In FIG. 2A, microoptical glazing 203 includes a receptor substrate 280 such as a pane of glass having a major surface 282, and a microoptical layer 293 bonded to at least a portion of the major surface 282. The microoptical layer 293 comprises a cured backfill layer 220 having a microstructured surface 222 and an opposing structured surface 224, and a cured (e.g. adhesive) layer 250 having a surface 254 adjacent microstructured surface 222, the cured (e.g. adhesive) layer 250 being immediately adjacent major surface 282. Cured (e.g. adhesive) layer 250 has a different refractive index than cured backfill layer 220. Typically, cured (e.g. adhesive) layer 250 has a lower refractive index than cured backfill layer 220. Further, (e.g. adhesive) layer 250 is generally index matched to receptor substrate 280 (e.g. glass). By "index matched" it is meant that the absolute value of the difference in refractive index is less than 0.05, 0.04, 0.03, 0.02, 0.01 or 0.001. The structured surface 224 is adjacent a low index material (such as air) having an index of refraction lower than the cured backfill layer 220.

As used herein, refractive index refers to the refractive index measured at 25° C. and at a wavelength of 550 nm, unless specified differently.

Figure 2B:
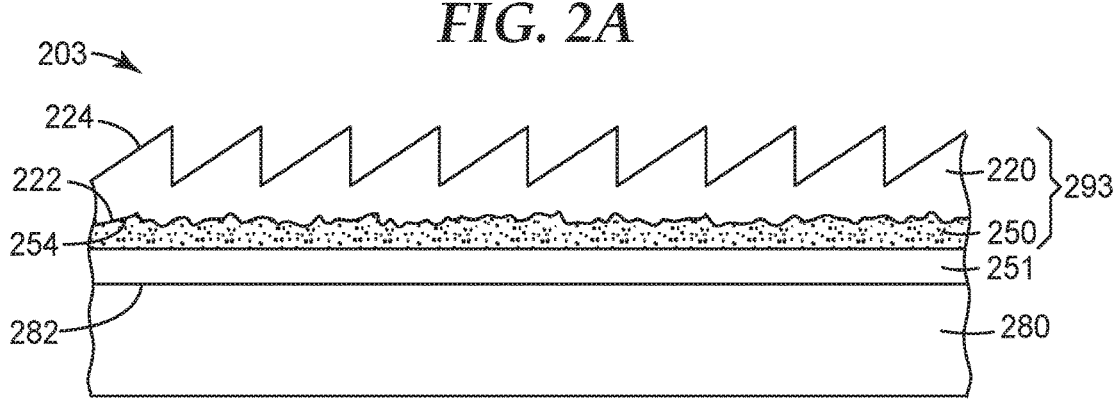

In FIG. 2B, microoptical glazing 203 includes a receptor substrate 280 such as a pane of glass having a major surface 282, and a microoptical layer 293 bonded to at least a portion of the major surface 282. The microoptical layer 293 comprises a cured backfill layer 220 having a microstructured surface 222 and an opposing structured surface 224, and a cured layer 250 having a surface 254 adjacent the microstructured surface 222, the cured layer 250 being immediately adjacent the major surface 282. Cured layer 250 has a different refractive index than cured backfill layer 220. Typically, cured layer 250 has a lower refractive index than cured backfill layer 220. In this embodiment, an additional adhesive layer 251 is disposed between cured layer 250 and receptor substrate 280. In this embodiment, adhesive layer 251 is generally index matched to receptor substrate 280 (e.g. glass). The structured surface 224 is adjacent a low index material (such as air) having an index of refraction lower than the cured backfill layer 220.

Figure 2C:
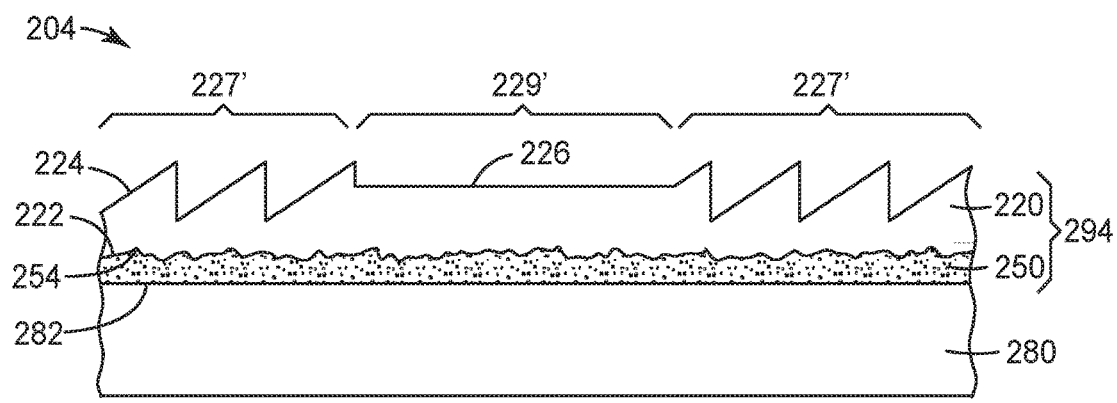

In FIG. 2C, microoptical glazing 204 includes a receptor substrate 280 such as a pane of glass having a major surface 282, and a microoptical layer 294 bonded to at least a portion of the major surface 282. The microoptical layer 294 comprises a cured backfill layer 220 having a microstructured surface 222, and an opposing surface that includes a first portion 227' having structured surface 224, and an adjacent second portion 229' having planar regions 226, that are disposed in a pattern. The microoptical layer 294 further includes a cured (e.g. adhesive) layer 250 having a surface 254 adjacent the microstructured surface 222. In one particular embodiment, microoptical layer 294 can result by transfer from a transfer tape 102 as shown and described in FIG. 1C. In one particular embodiment, the second portion 229' (i.e., the planar regions 226) of the microoptical layer 294 can result by reflow from an uncured portion of the transfer tape 100, the technique of reflow in Applicants' pending applications cited above.

The structured surface 224 and planar regions 226 are adjacent a low index material (e.g. air) having an index of refraction lower than the cured backfill layer 220. The pattern formed by the first and second portions 227', 229', of the microoptical glazing 201 can comprise a plurality of islands, lines, or a combination of islands and lines that extend over the surface of the receptor substrate 280, and can further comprise a gradient in areal density of the structured surface 224 from one end of the receptor substrate 280 to an opposing end, as shown elsewhere.

Figure 2D:
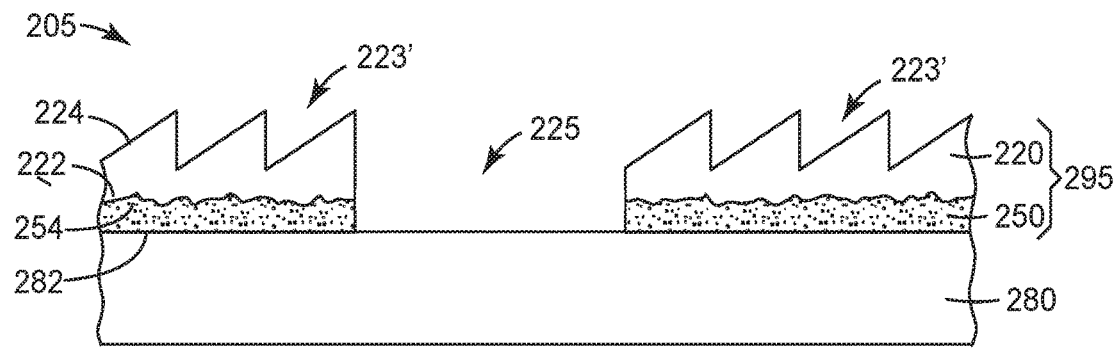

In FIG. 2D, microoptical glazing 205 includes a receptor substrate 280 such as a pane of glass having a major surface 282, and a microoptical layer 295 bonded to at least a portion of the major surface 282. The microoptical layer 295 comprises a cured backfill layer 220 having a microstructured surface 222 and an opposing surface that includes a first portion 223' having structured surface 224, and an adjacent second portions 225 lacking the microoptical layer 295, that are disposed in a pattern. The microoptical layer 295 further includes a cured (e.g. adhesive) layer 250 having a surface 254 adjacent the microstructured surface 222, the cured diffuser layer (i.e. microstructured surface 222 together with 250) being immediately adjacent the major surface 282. The structured surface 224 of the first portion 223', and the adjacent second portions 225 are adjacent a low index material having an index of refraction lower than the cured backfill layer 220. The pattern formed by the first and second portions 223', 225, of the microoptical glazing 205 can comprise a plurality of islands, lines, or a combination of islands and lines that extend over the surface of the receptor substrate 280, and can further comprise a gradient in areal density of the structured surface 224 from one end of the receptor substrate 280 to an opposing end, as shown elsewhere.

FIG. 3A shows a schematic cross-sectional view of a portion of an Insulated Glazing Unit (IGU) 300. IGU 300 includes a first plane of glass 380' separated by a gap 394, from a second pane of glass 380 facing the first pane of glass 380'. The first pane of glass 380' includes an outside (i.e. exterior) sun-facing surface "a" and a first pane interior surface "b". The second pane of glass 380 includes a second pane interior surface "c" and an (i.e. exterior) room-facing surface "d". A microoptical layer 390 includes microstructured surface 322 and layer 350 having a different (e.g. lower) refractive index than cured backfill layer immediately adjacent the microstructured surface. Layer 350 is typically an adhesive that further bonds microoptical layer 390 to at least a portion of the second pane interior surface "c". The refractive index of (e.g. adhesive) layer 350 is generally index matched to the glass 380.

The structured surface 324 is adjacent a low index material 392 filling the gap 394 between the first and second panes of glass, 380', 380. In some cases the low index material 392 may comprise a gas or a vacuum. The low index layer or material provides index contrast with microoptical layer 390.

Figure 4:
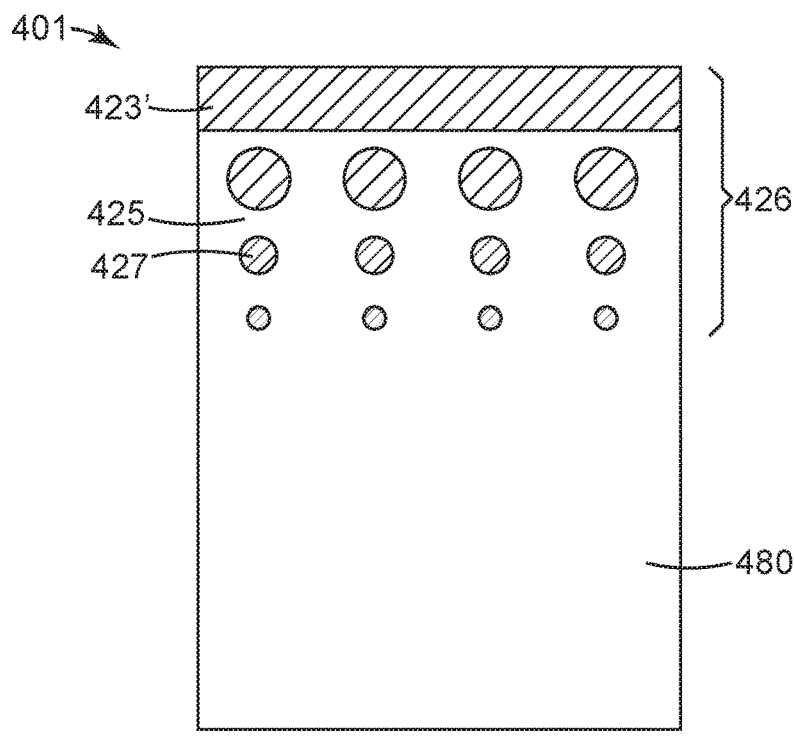
FIG. 4 shows a schematic front view of microoptical glazing.

It is to be understood that the pane of glass including the microoptical layer can have additional layers, such as shown in FIG. 2B FIG. 4 shows a schematic front view of a microoptical glazing 401, or alternately of a transfer tape useful for forming microoptical glazing 401, according to one aspect of the disclosure. Microoptical glazing 401 includes a pattern 426 of structured surface islands 427 and lines 423' separated by regions 425 similar to regions 225, 226 shown in FIGS. 2C-2D on pane of glass 380. Pattern 426 shows a gradient pattern that has a decrease in areal density of the structured surface lines 423' and islands 427 moving away from an edge of microoptical glazing 401.

Figure 5:
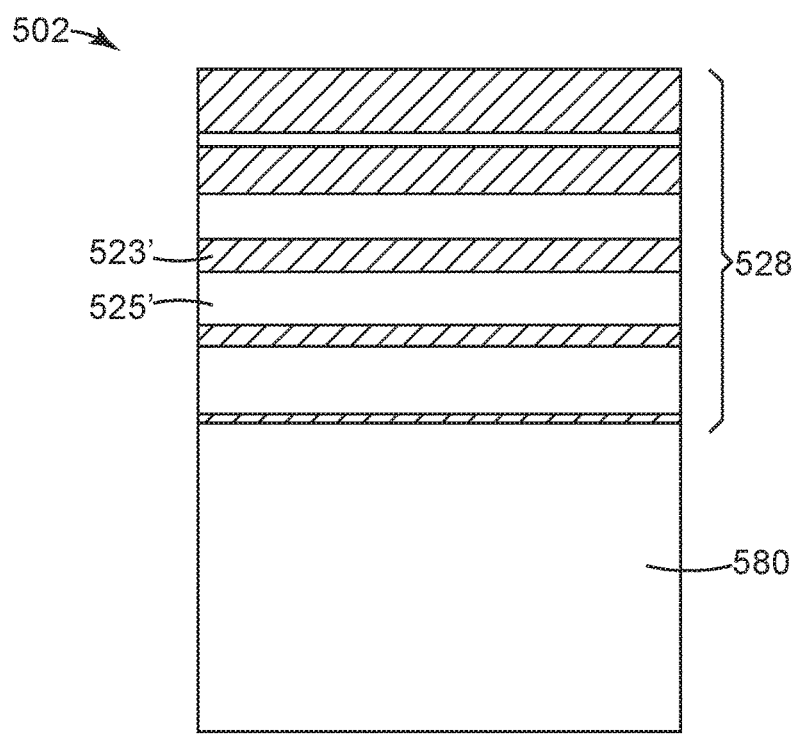
FIG. 5 shows a schematic front view of microoptical glazing.

FIG. 5 shows a schematic front view of a microoptical glazing 502, according to one aspect of the disclosure. Microoptical glazing 502 includes a pattern 528 of structured surface lines 523' separated by regions 525' similar to regions 225, 226 shown in FIG. 2C-2D on pane of glass 580. Pattern 528 shows a gradient pattern that has a decrease in areal density of the structured surface lines 523' moving away from an edge of microoptical glazing 502. It is to be understood that the pattern 526, 528 need not be a gradient pattern, and may be comprised of any desired assortment of islands, dots, lines, or any other regular or irregular shape.

Figure 6:
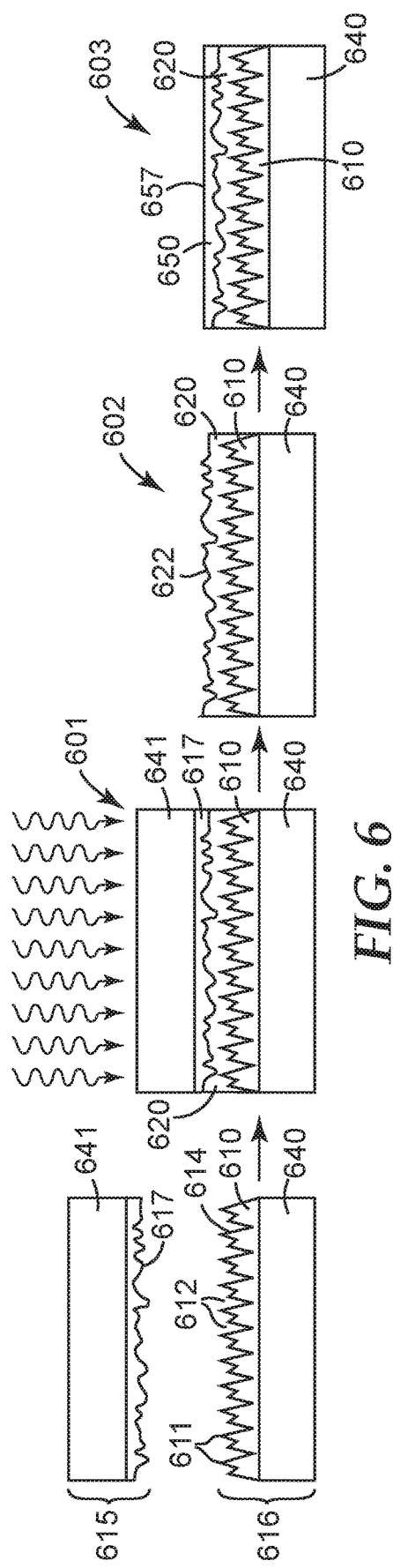
FIG. 6 is a schematic process flow diagram of forming a transfer film.

FIG. 6 is a schematic process flow diagram of an illustrative method of forming a transfer film. The method comprises providing a (e.g. first) template 616 comprising template layer 610 having structured surface 614 and optional carrier film 640. The method further comprises providing a curable backfill layer 620 (comprised of backfill material) on the structured surface 614 such that the backfill layer 620 has a major surface conforming with the structured surface of the first template and an opposing surface that is typically substantially planar (not shown), i.e. prior to contact with the second template 615.

The structured surface 614 of the template layer 610 comprises a plurality of peaks 611 and valleys 612. The backfill layer 620 typically has a thickness greater than the maximum height of the peaks 611.

The method further comprises contacting the opposing (e.g. planar) surface of the backfill layer with a second template 615. The second template comprises a microstructured layer surface 617 and optional carrier film 641. The method further comprises curing the backfill layer, i.e. while the structured surface 614 of the first template 616 and microstructured surface 617 of the second template 615 are in contact with backfill layer 620.

In some embodiments, the transfer tape 601 may comprise or consist of the first and second templates 616 and 615 and the cured backfill layer 620 therebetween. In this embodiment, an adhesive layer 650 may be applied to this transfer tape construction at the time of application to a receptor substrate (e.g. pane of glass). In this embodiment, the method of making microoptical glazing comprises providing the transfer tape 601, removing the second template 615; and bonding the cured microstructured backfill layer to pane of glass 680 with an adhesive 650, the adhesive having a different refractive index than the cured backfill layer 620 (e.g., the refractive indices may differ by at least 0.05 or at least 0.1).

In another embodiment, the method of making the transfer tape 602 further comprises removing the second template layer. In this embodiment, the transfer tape 602 may comprise or consist of the first template 616 and the cured backfill layer 620. In this embodiment, an adhesive layer 650 may also be applied to this transfer tape construction at the time of application to a receptor substrate (e.g. pane of glass). In this embodiment, the method of making a microoptical glazing comprises providing the transfer tape and bonding the cured microstructured backfill layer to a pane of glass 680 with an adhesive 650, the adhesive having a different refractive index than the cured backfill layer 620.

In yet another embodiment, the method of making transfer tape 603 further comprises providing a layer 650 on the microstructured surface of the cured backfill layer, wherein the layer has a different refractive index than the cured backfill layer. However, in this embodiments layer 650 is not an adhesive. A removable release liner (not shown) may be provided on the exposed major surface 657 of the adhesive layer, i.e. on the opposing surface relative to the microstructured surface of the cured backfill layer 620. In this embodiment, the method of making a microoptical glazing comprises providing the transfer tape, removing the release liner when present, and bonding the cured microstructured backfill layer to a pane of glass 680 by means of adhesive.

Figure 7:
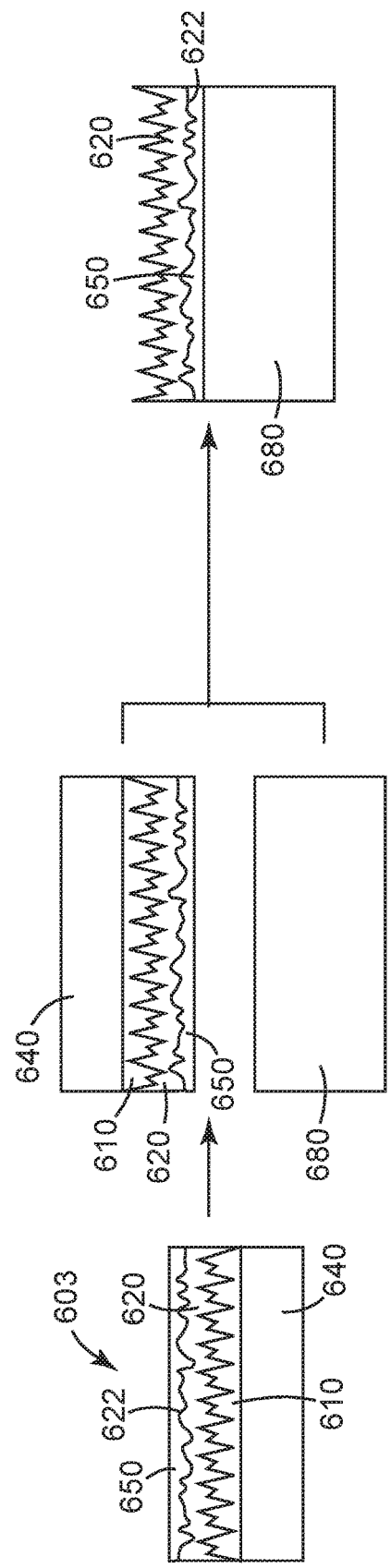
FIG. 7 is a schematic process flow diagram of forming a microoptical glazing.
Figure 9:
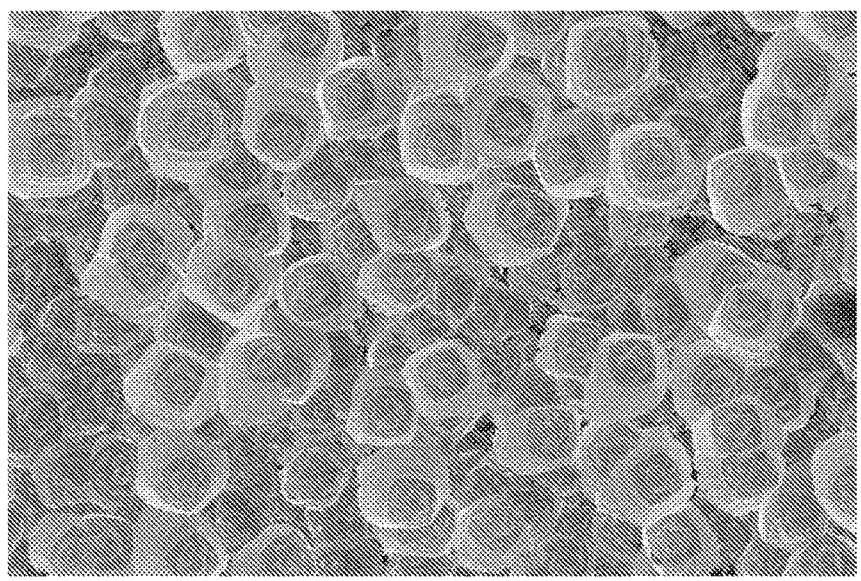
FIG. 9 is a scanning electron micrograph of a top plan view of a microstructured surface.
Figure 10:
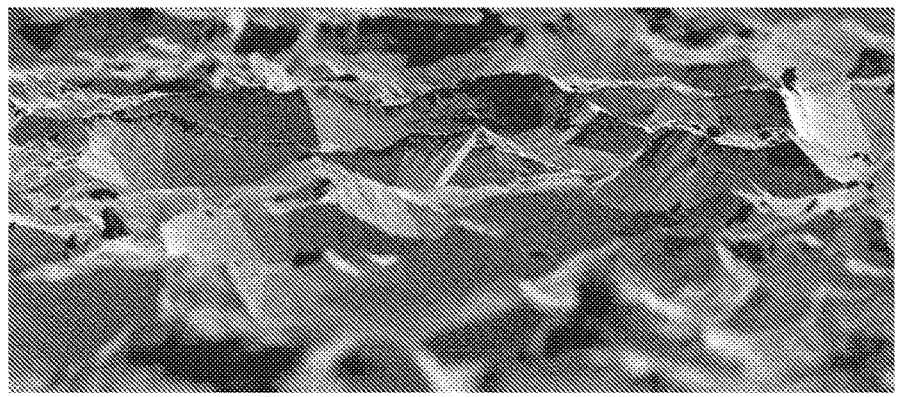
FIG. 10 is a scanning electron micrograph of a perspective view of a microstructured surface.

FIG. 7 is a schematic process flow diagram of an illustrative method of forming microoptical glazing utilizing a transfer tape wherein the layer adjacent the microstructured surface of the backfill material is an adhesive and such adhesive is present on the transfer tape and the time the transfer tape 603 is utilized for microoptical glazing. Thus, this embodiment comprises providing a transfer tape wherein the transfer tape comprises a first template 616 and a cured backfill layer 650. The cured backfill layer 620 (comprised of backfill material) is disposed on the structured surface 614 such that the backfill layer 620 has a major surface conforming with the structured surface 614 of the first template and an opposing microstructured 622 surface. The transfer tape further comprises an adhesive 650 disposed on the microstructured surface 622. The method of microoptical glazing comprises bonding the cured backfill layer to a pane of glass 680 by mean of the adhesive 650 provided on the microstructured surface of the backfill layer.

Each of the methods of microoptical glazing further comprise removing the first template 616. Thus, the microoptical glazing comprises the pane of glass 680, an adhesive layer bonding the pane of glass to the microoptical layer and a microstructured surface 622 between the pane of glass 680 and the cured microoptical layer 610. The first template 616 is typically removed by peeling the template from the cured backfill layer 620. Further in each of the methods of microoptical glazing methods and microoptical glazing articles, the adhesive is typically index matched to the receptor substrate (glass).

Alternative Methods of Providing Microstructured Diffusive Interface

Although the methods and article described herein wherein the backfill layer comprise a microstructured surface is a favored embodiment, there are alternative methods of providing a diffusive layer between the microoptical layer and the room-facing exterior surface of the glass.

Figure 12:
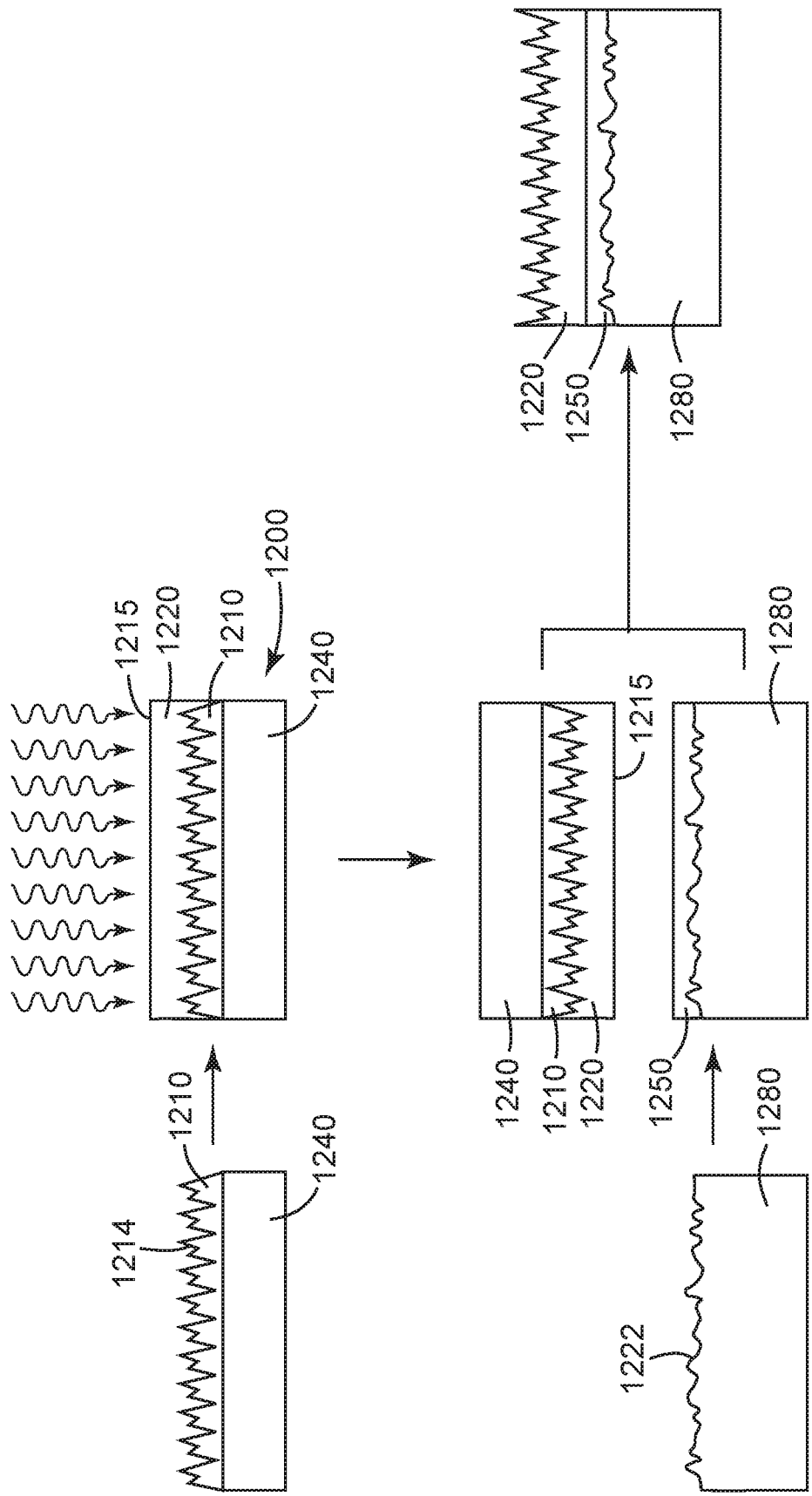
FIG. 12 is a schematic process flow diagram of an alternative method of forming a microoptical glazing with an embedded microstructured interface.

With reference to FIG. 12, in one embodiment, a method of making microoptical glazing comprises providing a transfer tape 1200, wherein the transfer tape comprises a first template layer 1210 having a structured surface 1214 and optional carrier film 1240 (the same as previously described embodiments). The transfer tape further comprises cured backfill layer 1220 on the structured surface 1214 such that the cured backfill layer has a major surface conforming with the structured surface 1214 of the first template. In this embodiment, the opposing surface 1215 of the cured backfill layer 1210 is planar, rather than microstructured. This method further comprises providing a piece of glass having an anisotropically roughened surface 1222. The roughened surface may be providing by abrading the surface or providing a diffusive layer (e.g., a microstructured layer form separately and attached to the surface) or coating on the surface. The roughened surface or diffusive layer or coating may have the same characteristics as the microstructured surface 322 described elsewhere herein. The method further comprises bonding the roughened surface 1220 of the glass 1280 to the opposing (planar) surface of the cured backfill layer 1220 with an adhesive layer 1250. The adhesive 1250 typically has substantially the same refractive index as the cured backfill layer 1220. Further, adhesive 1250 typically has a different refractive index than the glass 1280.

Figure 13:
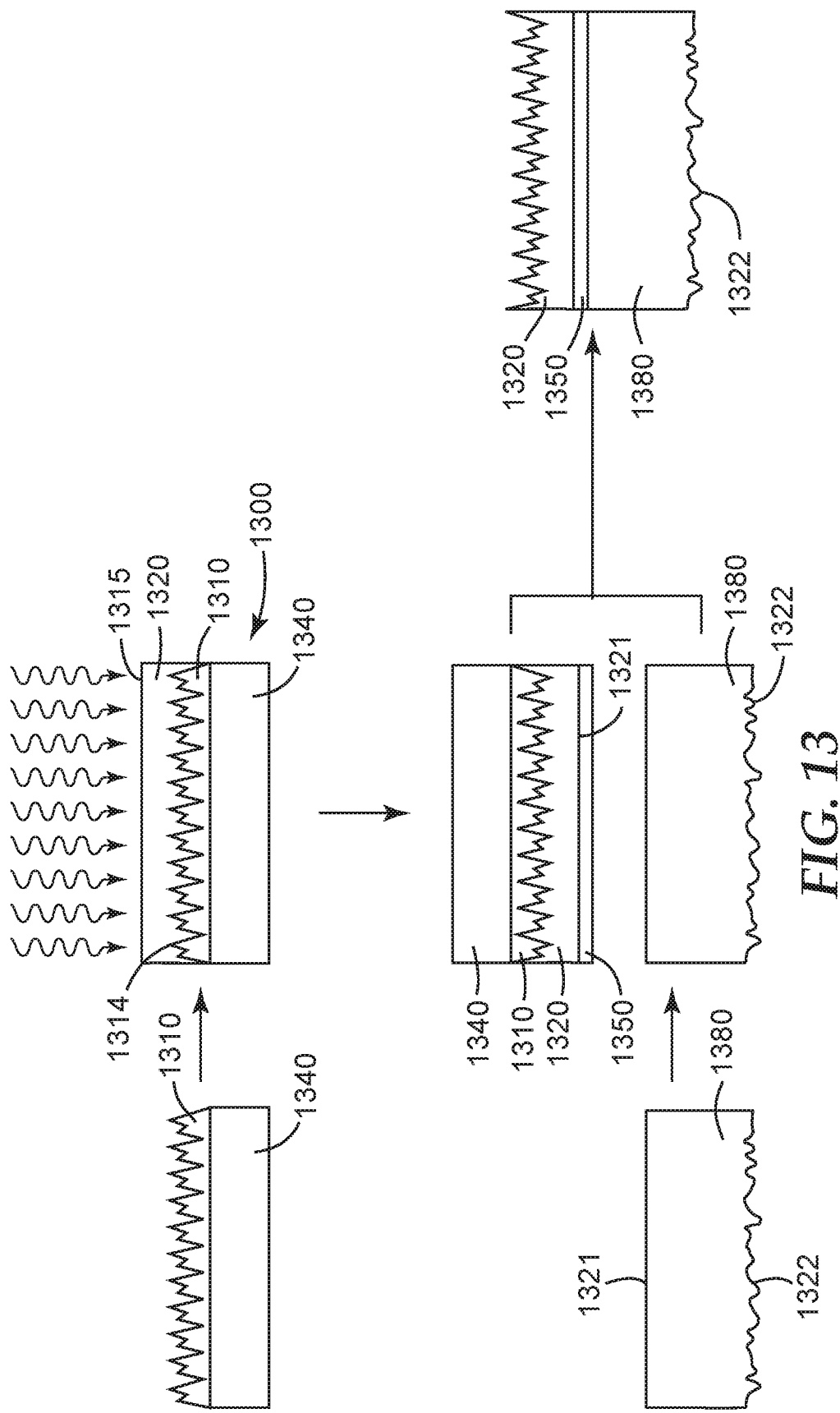
FIG. 13 is a schematic process flow diagram of an alternative method of forming a microoptical glazing with a microstructured interface disposed between the microoptical layer and room-facing exterior surface.
Figure 14:
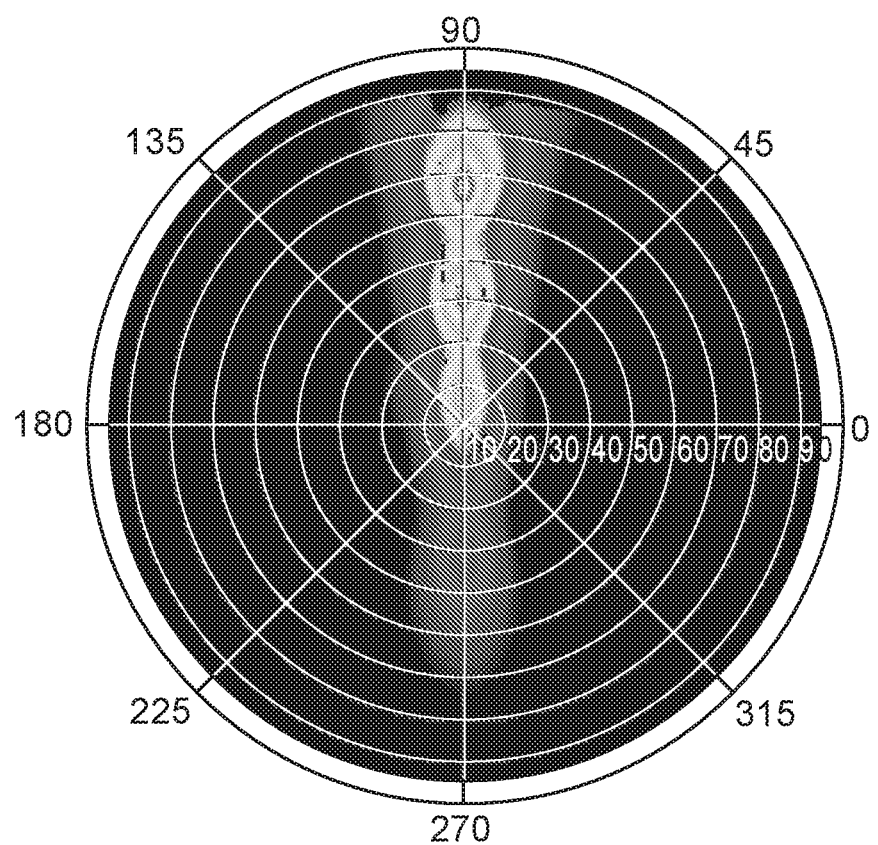
FIG. 14 depicts a bi-directional transmission distribution function (BTDF) plot for a microoptical glazing.

With reference to FIG. 13, in another embodiment, a method of making microoptical glazing comprises providing a transfer tape 1300, wherein the transfer tape comprises a first template layer 1310 having a structured surface 1314 and optional carrier film 1340 (the same as previously described embodiments). The transfer tape further comprises cured backfill layer 1320 on the structured surface 1314 such that the cured backfill layer has a major surface conforming with the structured surface 1314 of the first template. In this embodiment, the opposing surface 1315 of the cured backfill layer 1310 is planar, rather than microstructured. This method further comprises providing a piece of glass having an anistropically roughened surface 1322 and a planar 1321 (unroughened surface). The roughened surface may be providing by abrading the surface or providing a diffusive layer or coating on the surface. The roughened surface or diffusive coating may have the same characteristics as the microstructured surface 322 described elsewhere herein. The method further comprises bonding the planar surface 1321 of the glass 1380 to the opposing (planar) surface of the cured backfill layer 1320 with an adhesive layer 1350. The adhesive 1350 typically has substantially the same refractive index (index matched) as the cured backfill layer 1320. Further, adhesive 1350 typically has the same refractive index than the glass 1380.

Template Layer

The structured surface 114 is typically one-dimensional (1D), meaning the structures are periodic in only one dimension, that is, nearest-neighbor features are spaced equally in one direction along the surface, but not along the orthogonal direction. One-dimensional structures include, for example, continuous or elongated prisms or ridges, linear gratings, cylindrical or curved lens-shaped features, and random structures including chaos structures, and the like.

The structured surface 114 can generally include surface features that are any desirable height, for example heights suitable for microoptical refractive surfaces, and may range from a few nanometers to several micrometers in height, such as greater than about 1 micrometer, or greater than about 5 micrometers, or greater than about 10 micrometers, or greater than about 20 micrometers, or greater than about 50 micrometers, or greater than about 100 micrometers, or even about 2000 micrometers or more in height. The microoptical refractive surfaces may be useful for decorative, functional, or a combination of decorative and functional redistribution of light through a material, such as used in architectural glazing.

Although structured surface 114 may have structures that are smaller in size than microstructured surface 122, for convenience the term "structure" or "structured" is being used herein with reference to the (e.g. light directing) structures 114. Further, the term "microstructured" is being used with reference to the microstructured diffusive surface 122.

In one favored embodiment, the microoptical refractive structures (e.g. 390 of FIG. 3) formed from structured surface 114 are suitable for redirecting at least 75 or 80% of the light upwards for an input angle ranging from 30° to 60° (e.g. 45°).

Figure 11:
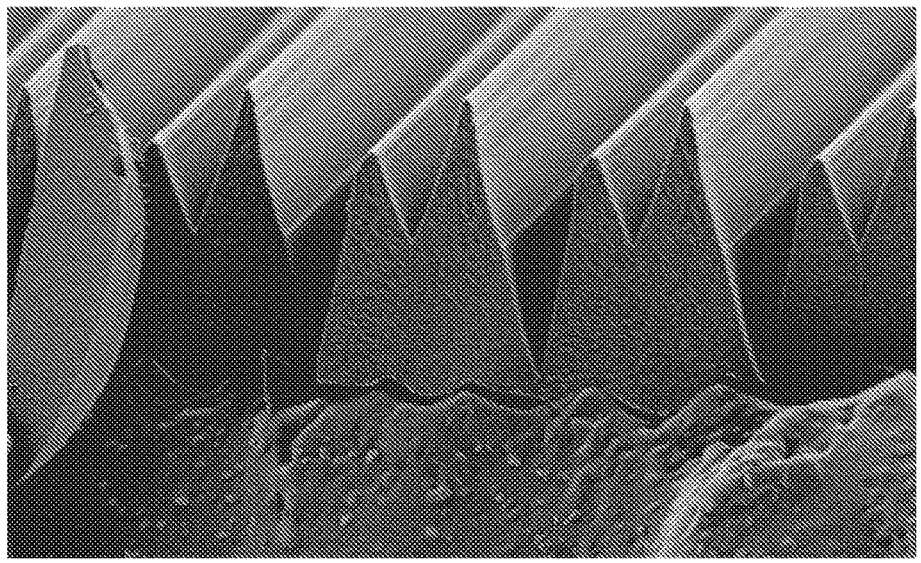
FIG. 11 is a scanning electron micrograph of a perspective view of a daylight redirecting structure disposed on a microstructured surface.

In some embodiments, such as depicted in FIG. 11 the (e.g. light redirecting) structures are substantially larger in size relative to the microstructures of the diffusive microstructured surface. For example, in some embodiment, the mean (peak) height of the diffusive microstructures is no greater than 5, 4, 3, 2, or 1 micrometer.

Microstructured Surface

Figure 3:
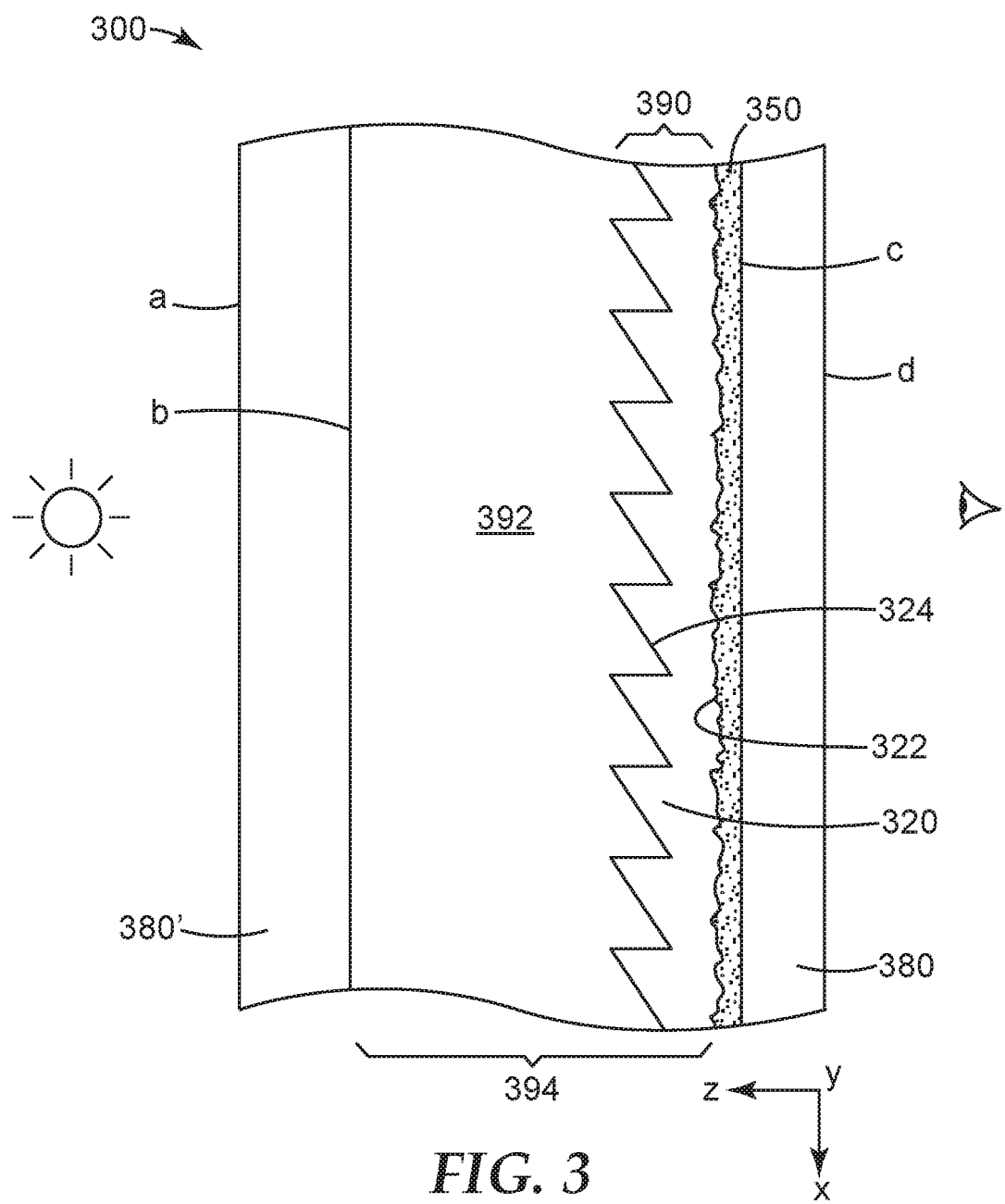
FIG. 3 shows a schematic cross-sectional view of a portion of an Insulated Glazing Unit (IGU)

With reference to FIG. 3, sunlight passing through the film and is redirected upwards by the structured microoptical layer 390 and then scattered or diffused as a result of refraction (and to some extent diffraction) by the topography of major surface 322 (or otherwise roughened surface, as will subsequently be described). The microstructured surface 322 (as well as 1222 and 1322) can be primarily present to diminish the occurrence of a solar column.

The microstructured surface extends generally along orthogonal in-plane directions, which can be used to define a local Cartesian x-y-z coordinate system. The topography of the microstructured surface can then be expressed in terms of deviations along a thickness direction (z-axis), relative to a reference plane (the x-y plane) lying parallel to the microstructured surface. In many cases, the topography of the microstructured surface is such that distinct individual microstructures can be identified. Such microstructures may be in the form of protrusions, which are made from corresponding cavities in the microstructured surface tool, or cavities, which are made from corresponding protrusions in the microstructured surface tool. In some embodiments, the microstructures are limited in size along two orthogonal in-plane directions, i.e., when the microstructured surface is seen in plan view, individual microstructures do not extend indefinitely in a linear fashion along any in-plane direction. In other embodiments, the microstructured surface may include lenticular elements that extend in an in-plane direction. Whether protrusions or cavities, the microstructures may also in some cases be closely packed, i.e., arranged such that at least portions of boundaries of many or most adjacent microstructures substantially meet or coincide. The microstructures are also typically irregularly or non-uniformly dispersed on the microstructured surface. In some cases, some, most, or substantially all (e.g., >90%, or >95%, or >99%) of the microstructures may be curved or comprise a rounded or otherwise curved base surface. In some cases, at least some of the microstructures may be pyramidal in shape or otherwise defined by substantially flat facets.

The microstructured surface can also be characterized with reference to various roughness metrics, such as Ra and Rz, defined as follows:

Ra—Average roughness calculated over the entire measured array.

$$Ra = \frac{1}{MN}\sum_{i=1}^{M}\sum_{k=1}^{N}|Z_{jk}|$$

where $Z_{jk}$=the difference between the measured height of each pixel and the mean height of the array, Rz is the average maximum surface height of the ten largest peak-to-valley separations in the evaluation area, $$Rz = \frac{1}{10}[(H_1+H_2+\ldots+H_{10})-(L_1+L_2+\ldots+L_{10})]$$

where H is a peak height and L is a valley height, and H and L have a common reference plane.

In some embodiments, Ra is no greater than 3, 2.5, 2, or 1.5 micrometers. In some embodiments, Rz is no greater than 30, 25, 20, or 15 micrometers.

In some embodiments, the size of a given microstructure may be expressed in terms of an equivalent circular diameter (ECD) in plan view, and the microstructures may have an average ECD of less than 15 micrometers, or less than 10 micrometers, or in a range from 4 to 10 micrometers, for example. The microstructured surface and structures can also be characterized with other parameters as discussed elsewhere herein, e.g., by an aspect ratio of the depth or height to a characteristic transverse dimension such as ECD, or the total length of ridges on the surface per unit area in plan view.

Light diffusion or scattering can be expressed in terms of "optical haze", or simply "haze". In some embodiments, the microstructured diffuser has a high haze, e.g., greater than 85% or greater than 90% haze when the layer adjacent the microstructured surface is air. In other embodiments, the diffuser has a relatively low haze, e.g., less than 85%, or less than 75%, or less than 60%. Further, the optical haze, optical clarity, and other characteristics of the diffusive layer can be provided without the use of any beads (e.g. matte particles) at or on the microstructured surface, or elsewhere within the optical film. Haze, or optical haze, can be measured as described in ASTM D1003-13 "Standard Test Method for Haze and Luminous Transmittance of Transparent Plastics". Haze can be determined using a HAZE-GARD PLUS meter available from BYK-Gardner Inc. (Silver Springs, Md.) which is cited in the ASTM D1003-13 standard. Related to haze is clarity, or optical clarity, which can also be measured according to the ASTM D1003-13 standard by using the HAZE-GARD PLUS haze meter. The luminous transmission can also be measured according to the ASTM D1003-13 standard using the HAZE-GARD PLUS haze meter.

In some embodiments, the microstructured diffuser diffuses a significant fraction of light incident at normal incidence scattered outside a cone of half angle 2.5 degrees, but inside a cone with a half angle less than about 15 degrees (or even 10 degrees) such that the daylight redirecting property is not impaired.

The diffusive microstructured surface can be made using any suitable fabrication method. The microstructures are generally fabricated by casting and curing a polymerizable resin composition in contact with a tool surface such as described in U.S. Pat. No. 5,175,030 (Lu et al.) and U.S. Pat. No. 5,183,597 (Lu). The tool may be fabricated using any available fabrication method, such as by using engraving or diamond turning. Exemplary diamond turning systems and methods can include and utilize a fast tool servo (FTS) as described in, for example, PCT Published Application No. WO 00/48037 (Campbell et al.), and U.S. Pat. No. 7,350,442 (Ehnes et al.) and U.S. Pat. No. 7,328,638 (Gardiner et al.). In some embodiments, the microstructured surface may be formed as generally described in U.S. Pat. No. 8,657,472 (Aronson et al.) or U.S. Pat. No. 8,888,333 (Yapel et al.), though in some cases it may be desired for the haze of the microstructured surface or resulting microstructured interface to be greater than those provided by the surfaces of U.S. Pat. No. 8,657,472 (Aronson et al.) or U.S. Pat. No. 8,888,333 (Yapel et al.).

Alternatively, the tool may be fabricated by electrodeposition. In one embodiment, the tool is prepared by forming a first layer of a metal by electrodepositing the metal using a first electroplating process resulting in a first major surface of the first layer having a first average roughness; and forming a second layer of the metal on the first major surface of the first layer by electrodepositing the metal on the first major surface using a second electroplating process resulting in a second major surface of the second layer having a second average roughness smaller than the first average roughness; as described in WO2014/081693 (Pham et al.). Each of WO 2014/081693 (Pham et al.), U.S. Pat. No. 8,657,472 (Aronson et al.), and U.S. Pat. No. 8,888,333 (Yapel et al.) are hereby incorporated by reference herein to the extent that they do not contradict the present description.

The microstructured surface is typically the opposing surface of the backfill layer. Thus the refractive index of the microstructured surface is the same as the backfill layer. A layer 150 is disposed adjacent and is typically in direct contact with the microstructured surface. Layer 150 comprises a material having a different refractive index than the backfill layer. The difference is refractive index is at least 0.05 or 0.10. The microstructured surface of the backfill layer together with this adjacent layer forms a diffusive interface. In a favored embodiment, layer 150 is an (optically clear) adhesive that is also suitable for bonding the backfill layer to a receptor substrate (e.g. pane of glass). However, the transfer tape may provide a separate adhesive layer as well as other optional layers such as described with reference to FIG. 2B.

Typically, diffusers used in connection with light redirecting films have been high haze diffusers (e.g., greater than 90 percent haze). According to the present description, it has been found that diffusers (either separate diffuser layers of barrier elements adapted to diffuse visible light) having relatively low haze and relatively low clarity are particularly advantageous over other diffusers when used with daylight redirecting microoptics. For example, suitable diffusers may have an optical haze in the range of 20 percent to 85 percent and an optical clarity of no more than 50 percent. Diffusers having an optical haze in the range of 20 percent to 75 percent and an optical clarity in the range of 5 percent to 40 percent have been found to be particularly advantageous. In some embodiments, the optical haze is in the range of 20, or 25 or 30 percent to 55, 57, 60, 65, 70, 75, 80, or 85 percent, and the optical clarity is in the range of 5, or 7, or 10 percent, to 35, or 37, or 40, or 45, or 50 percent.

It has been found that diffusers having a haze and a clarity in these ranges provide an angular spread of the solar column that substantially reduces glare while keeping the angular spread solar column sufficiently low that an occupant in a room with the light redirecting optics on a widow of the room can avoid the solar column altogether by small shifts in position. High haze is caused by wide angle scattering, while low clarity is caused by narrow angle scattering. It may be desired for the clarity to be low (e.g., less than 40 percent) and the haze to be low (e.g., less than 75 percent). Larger haze values (e.g., greater than 85 percent) can spread the solar column so that the bright region is diffuse but cannot be avoided by small shifts in position and could cause glare for multiple occupants. Higher clarity values (e.g., greater than 50 percent) may provide inadequate angular spread to reduce the high objectionable glare of the solar column.

In some cases it may be useful to characterize the microstructured surface (or microstructured interface comprising the microstructured surface) of the diffusers of the present description in terms of the slope distributions of the surface. In some embodiments, no more than about 20 percent, or no more than about 10 percent, or no more than about 7 percent, or no more than about 5 percent, or no more than about 3 percent of the microstructured surface has a slope magnitude that is greater than about 20 degrees, greater than about 15 degrees, greater than about 10 degrees, or greater than about 7 degrees, or greater than about 5 degrees, or greater than about 3.5 degrees. In some embodiments, the microstructured surface may have steeper slopes. For example, in some embodiments, no more than about 20 percent, no more than about 10 percent, no more than about 7 percent of the microstructured surface has a slope magnitude that is greater than about 20 degrees, or greater than about 30 degrees, or greater than about 35 degrees or greater than about 40 degrees.

It may be desired for a large fraction, or substantially all of the microstructured surface to have a slope that contributes to the haze. In some embodiments, a substantial fraction of the microstructured surface has a slope magnitude greater than 1 degree. In some embodiments, at least about 80 percent, or at least about 85 percent, or at least about 90 percent, or at least about 95 percent of the structured surface has a slope magnitude that is greater than 1 degree, or greater than 2 degrees, or greater than 3 degrees. In some embodiments, less than 5 percent, or less than 2 percent, or less than 1 percent of the structured surface has a slope magnitude that is less than 3 degrees, or less than 2 degrees, or less than 1 degree.

The microstructured surface can be characterized using atomic force microscopy (AFM) or confocal scanning laser microscopy (CSLM), for example, to determine a surface profile H(x,y) (i.e., a height, H, of the surface above a reference plane as a function of orthogonal in-plane coordinates x and y). Slopes $S_x$ and $S_y$ along respective x- and y-directions can then be calculated from the following two expressions:

$$S_x = \partial H(x,y)/\partial x$$

$$S_y = \partial H(x,y)/\partial y$$

The slope magnitude $S_m$ can be calculated from the following expression:

$$S_m = \sqrt{[\partial H/\partial x]^2 + [\partial H/\partial y]^2}.$$

The distributions of the slope in the x-direction, the slope in the y-direction, and the slope magnitude can be determined.

In some embodiments, the microstructured surface includes asymmetric light diffusing surface structures and the structured surface is configured to provide higher diffusion in a first direction than in a second direction orthogonal to the first direction. When daylight redirecting microoptics are used in a window or an IGU, the first direction may be a horizontal direction and the second direction may be a vertical direction. It may be desired to limit the diffusion along the vertical axis to minimize any downward redirection of light intended to be directed upward. In this case, the overall diffusion and glare would be limited if using an isotropic diffuser, while an anisotropic diffuser can provide a high degree of diffusion along the horizontal axis while limiting the diffusion along the vertical axis. Anisotropic or asymmetric diffusers can be designed to minimize glare and mitigate the solar column effect by diffusing in the horizontal direction, without degrading the performance of the daylight redirecting microoptics by undesirably diffusing in the vertical direction.

In some cases it may be desired to provide a relatively high degree of diffusion in the horizontal direction and a smaller degree of diffusion in the vertical direction. Some degree of diffusion in the vertical direction may be desired to provide a more uniform lighting on the ceiling, for example. Suitable asymmetric or anisotropic diffusers that can provide a high degree of diffusion in a first direction (e.g., horizontal direction) and a lower but non-zero degree of diffusion in a second direction (e.g., vertical direction) orthogonal to the first direction may be provided by structures elongated further in the second direction than the first direction and having differing radii of curvature in the first and second directions. The structures may be randomly or pseudo-randomly distributed on the diffusing surface in one or two in-plane directions. The structured surface of the light redirecting layer may include elements (e.g., prisms) extending in the first direction (e.g., extending across a width of the light redirecting layer in the first direction) and adapted to redirect light in the second direction.

Figure 15:
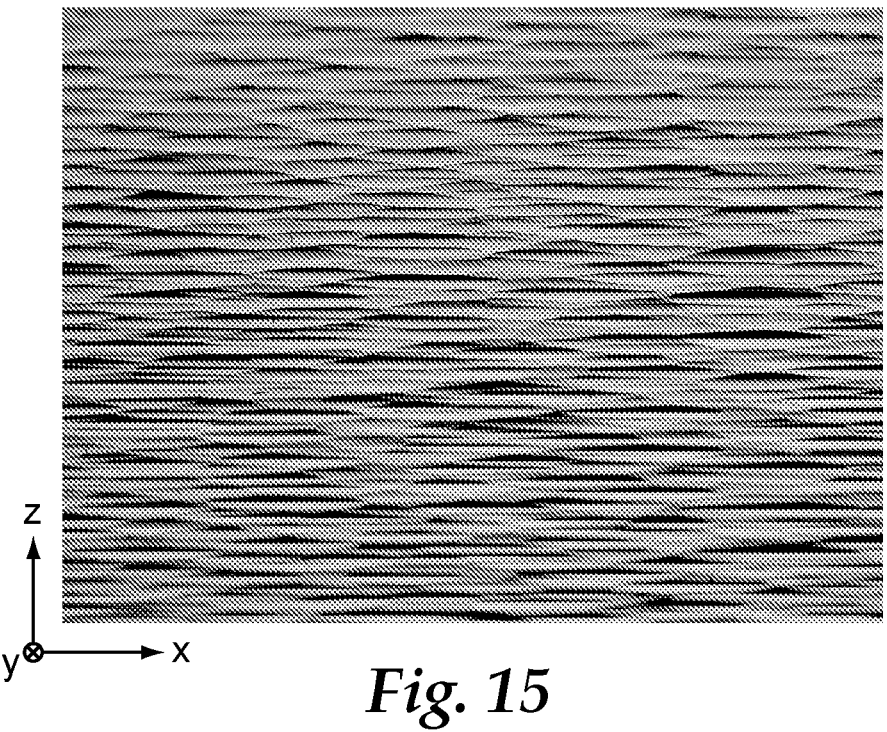
FIGS. 15-17 are optical micrographs of microstructured surfaces.
Figure 16:
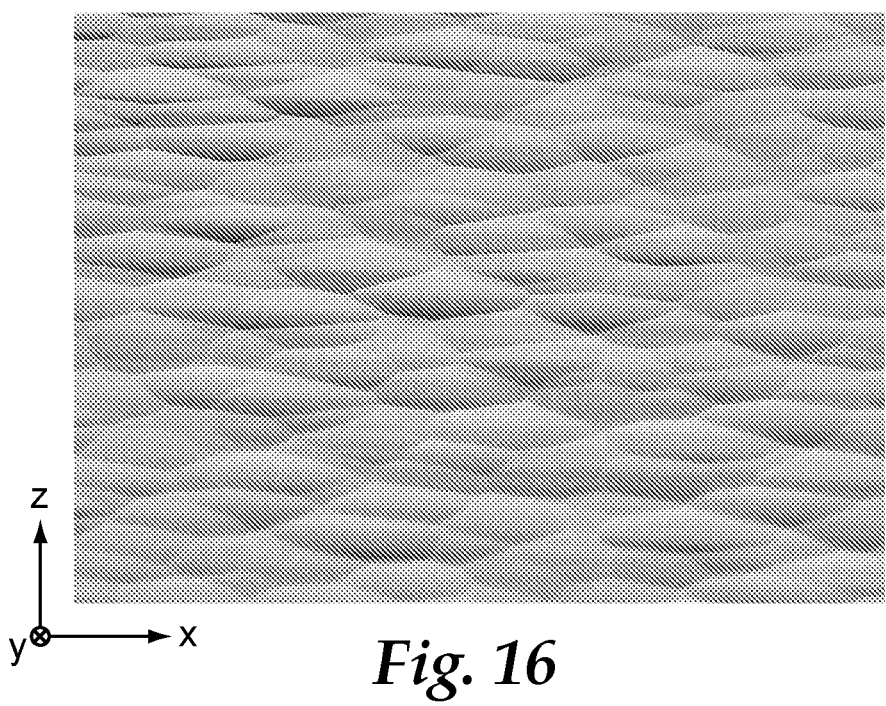
Figure 17:
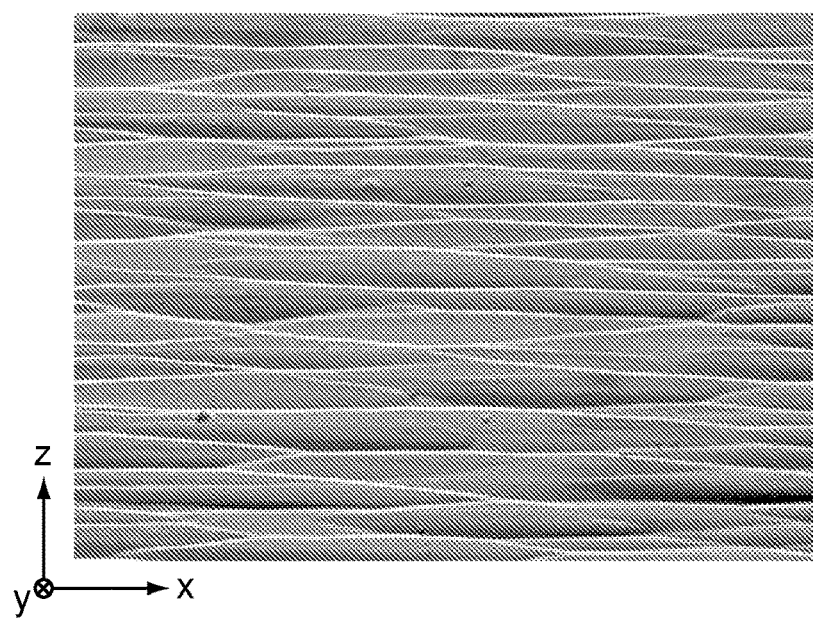

Suitable anisotropic diffusing surfaces are shown in FIGS. 15-17 which are top-view optical micrographs of samples that were made using a cutting tool to make patterned rolls which were subsequently microreplicated as described in U.S. Pat. No. 8,657,472 (Aronson et al.). The sample of FIG. 15 was geometrically asymmetric and had an asymmetric slope distribution. In particular, the sample had an average slope magnitude of about 0.07 degrees along the x-direction and an average slope magnitude of about 1.48 degrees along the y-direction. The sample of FIG. 16 was geometrically asymmetric and had an asymmetric slope distribution. In particular, the sample had an average slope magnitude of about 0.18 degrees along the x-direction and an average slope magnitude of about 0.85 degrees along the y-direction. The surface structures of the sample of FIGS. 15-17 may be described as approximately semi-ellipsoidal (half of an ellipsoid) or approximately semi-biconic (half of a bicone) structures.

In some embodiments, the asymmetric surface structures of the microstructured surface extend in a first direction (e.g., the vertical direction) more than in the second direction (e.g., the horizontal direction) orthogonal to the first direction. In some embodiments, the surface structures have a first average length in a first direction and a second average length in a second direction orthogonal to the first direction. The first length divided by the second length may be described as an in-plane aspect ratio. In some embodiments, in-plane aspect ratio or the first length divided by the second length is greater than 1.1, or greater than 1.2, or greater than 1.5, or greater than 2, or greater than 5, or greater than 10. In some embodiments, in-plane aspect ratio is in a range of 1.1 to 20, or to 100, or to 200, or to 500, or to 1000. In some embodiments, the surface structures are lenticular elements extending indefinitely in the first direction. The structured surface of the light redirecting layer may include elements (e.g., prisms) extending in the second direction (e.g., extend across a width of the light redirecting layer in the second direction) and adapted to redirect light in the first direction.

In some embodiments, the microstructured surface has a surface angle distribution having a first half width at half maximum (HWHM) in a first direction (e.g., a distribution of slopes in the x-direction, $S_x$, may have a HWHM of $\sigma_x$) and a second surface angle distribution having a second HWHM in a second direction different from the first direction (e.g., a distribution of slopes in the y-direction, $S_y$, may have a HWHM of $\sigma_y$). In some embodiments, the first HWHM is substantially equal to the second HWHM and in some embodiments, the first HWHM is different from the second HWHM. For example, $|\sigma_x-\sigma_y|$ may be in a range of about 1 degree to about 5 degrees, or to about 10 degrees, or to about 15 degrees. In some embodiments, each of $\sigma_x$ and $\sigma_y$ are in a range of about 1 degree to about 10 degrees, or to about 15 degrees. In some embodiments, the ratio of the larger of $\sigma_x$ and $\sigma_y$ to the smaller of $\sigma_x$ and $\sigma_y$ is greater than 1, or greater than 1.1, or greater than 1.2, or greater than 1.5 and is less than 20, or less than 15, or less than 10. In some embodiments, $|\sigma_x-\sigma_y|$ divided by $\sigma_x+\sigma_y$ is greater than 0.05, or greater than 0.1, or greater than 0.2.

Optical Adhesive Layer

In several embodiments, layer 150, 250, or 350 in an (e.g. optical) adhesive layer. The (e.g. optical) adhesive can be a pressure sensitive adhesive or a structural adhesive that is not pressure sensitive. In typical embodiments, the adhesive is "optically clear" referring to a material that has a luminous transmission of greater than about 90 percent, a haze of less than about 2 or 1.5 percent, in the 350 to 800 nm wavelength range. The haze is typically less than 1 or 0.5 percent. Further, the opacity is typically less than about 1 percent. Typically, the optically clear adhesive may be visually free of bubbles. The optical adhesive is also desirably non-yellowing initially and after accelerated aging. For example, the CIELAB b* is typically less than 1.5, or 1.0 or 0.5 for a thickness of 10 mils (about 250 micrometers).

Although various optical adhesives are known in the art, in some embodiments the optical adhesive comprises an organosilicon polymer, such as a polydiorganosiloxane. The term "polydiorganosiloxane" refers to a divalent segment of formula

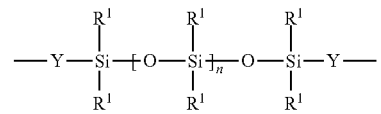

where each $R^1$ is independently an alkyl, haloalkyl, aralkyl, alkenyl, aryl, or aryl substituted with an alkyl, alkoxy, or halo; each Y is independently an alkylene, aralkylene, or a combination thereof; and subscript n is independently an integer of 1 to 1500. In some embodiments, n is at least 25, 50, or greater.

In some embodiments, the optical adhesive comprises a polydiorganosilane polyoxamide copolymer, such as described in U.S. Pat. No. 7,947,376 (Sherman et al.) and U.S. Pat. No. 8,765,881 (Hays et al.).

The polydiorganosiloxane have many desirable properties such as low glass transition temperatures, thermal and oxidative stability, resistance to ultraviolet radiation, low surface energy and hydrophobicity, and high permeability to many gases. Additionally, the copolymers exhibit good to excellent mechanical strength.

Pressure sensitive adhesives and heat activated adhesives can be formulated by combining the polydiorganosiloxane polyoxamides with a tackifier such as a silicate tackifying resin. As used herein, the term "pressure sensitive adhesive" refers to an adhesive that possesses sufficiently aggressive and permanent tack; sufficient strength to bond the microoptical layer to a receptor substrate such as glass; and in some embodiments typical sufficient cohesive strength to be removed cleanly from the receptor substrate. As used herein, the term "heat activated adhesive" refers to an adhesive composition that is essentially non-tacky at room temperature but that becomes tacky above room temperature above an activation temperature such as above about 30° C. Heat activated adhesives typically have the properties of a pressure sensitive adhesive above the activation temperature.

Tackifying resins such as silicate tackifying resins are added to the polydiorganosiloxane polyoxamide copolymer to provide or enhance the adhesive properties of the copolymer. The silicate tackifying resin can influence the physical properties of the resulting adhesive composition. For example, as silicate tackifying resin content is increased, the glassy to rubbery transition of the adhesive composition occurs at increasingly higher temperatures.

Suitable silicate tackifying resins include those resins composed of the following structural units M (i.e., monovalent $R'_3SiO_{1/2}$ units), D (i.e., divalent $R'_2SiO_{2/2}$ units), T (i.e., trivalent $R'SiO_{3/2}$ units), and Q (i.e., quaternary $SiO_{4/2}$ units), and combinations thereof. Typical silicate resins include MQ silicate tackifying resins, MQD silicate tackifying resins, and MQT silicate tackifying resins. These silicate tackifying resins usually have a number average molecular weight in the range of 100 to 50,000 or in the range of 500 to 15,000 and generally have methyl R' groups.

MQ silicate tackifying resins are copolymeric resins having $R'_3SiO_{1/2}$ units ("M" units) and $SiO_{4/2}$ units ("Q" units), where the M units are bonded to the Q units, each of which is bonded to at least one other Q unit. Some of the $SiO_{4/2}$ units ("Q" units) are bonded to hydroxyl radicals resulting in $HOSiO_{3/2}$ units ("$T^{OH}$" units), thereby accounting for the silicon-bonded hydroxyl content of the silicate tackifying resin, and some are bonded only to other $SiO_{4/2}$ units.

Suitable silicate tackifying resins are commercially available from sources such as Dow Corning, Midland, Mich., General Electric Silicones Waterford, N.Y. and Rhodia Silicones, Rock Hill, S.C. Examples of particularly useful MQ silicate tackifying resins include those available under the trade designations SR-545 and SR-1000, both of which are commercially available from GE Silicones, Waterford, N.Y. Such resins are generally supplied in organic solvent and may be employed in the formulations of the adhesives of the present invention as received. Blends of two or more silicate resins can be included in the adhesive compositions.

The adhesive compositions typically contain 20 to 80 weight percent polydiorganosiloxane polyoxamide and 20 to 80 weight percent silicate tackifying resin based on the combined weight of polydiorganosiloxane polyoxamide and silicate tackifying resin. For example, the adhesive compositions can contain 30 to 70 weight percent polydiorganosiloxane polyoxamide and 30 to 70 weight percent silicate tackifying resin, 35 to 65 weight percent polydiorganosiloxane polyoxamide and 35 to 65 weight percent silicate tackifying resin, 40 to 60 weight percent polydiorganosiloxane polyoxamide and 40 to 60 weight percent silicate tackifying resin, or 45 to 55 weight percent polydiorganosiloxane polyoxamide and 45 to 55 weight percent silicate tackifying resin.

The adhesive composition can be solvent-free or can contain a solvent. Suitable solvents include, but are not limited to, toluene, tetrahydrofuran, dichloromethane, aliphatic hydrocarbons (e.g., alkanes such as hexane), or mixtures thereof. The adhesive compositions can further include other additives as known in the art.

Carrier Film

The first and second template layers may comprise an optional carrier film (e.g. 140, 640, 641). The optical carrier film can be any suitable film, including, for example, thermally stable flexible films that can provide mechanical support for the other layers. The optional carrier film 140 may be thermally stable above 50° C., or alternatively 70° C., or alternatively above 120° C. One example of an optional carrier film 140 is polyethylene terephthalate (PET). In some embodiments, the optional carrier film 140 can include paper, release-coated paper, non-wovens, wovens (fabric), metal films, and metal foils.

Various organic polymeric film substrates comprised of various thermosetting or thermoplastic polymers are suitable for use as the optional carrier film 140. The support may be a single layer or multi-layer film. Illustrative examples of polymers that may be employed as the optional carrier film include (1) fluorinated polymers such as poly(chlorotrifluoroethylene), poly(tetrafluoroethylene-cohexafluoropropylene), poly(tetrafluoroethylene-co-perfluoro(alkyl)vinylether), poly(vinylidene fluoride-cohexafluoropropylene); (2) ionomeric ethylene copolymers poly(ethylene-co-methacrylic acid) with sodium or zinc ions such as SURLYN-8920 Brand and SURLYN-9910 Brand available from E. I. duPont Nemours, Wilmington, Del.; (3) low density polyethylenes such as low density polyethylene; linear low density polyethylene; and very low density polyethylene; plasticized vinyl halide polymers such as plasticized poly (vinylchloride); (4) polyethylene copolymers including acid functional polymers such as poly(ethylene-co-acrylic acid) "EAA", poly(ethylene-co-methacrylic acid) "EMA", poly (ethylene-co-maleic acid), and poly(ethylene-co-fumaric acid); acrylic functional polymers such as poly(ethylene-co-alkylacrylates) where the alkyl group is methyl, ethyl, propyl, butyl, et cetera, or CH3 (CH2)n- where n is 0 to 12, and poly(ethylene-co-vinylacetate) "EVA"; and (5) (e.g.) aliphatic polyurethanes. The optional carrier film can be an olefinic polymeric material, typically comprising at least 50 wt-% of an alkylene having 2 to 8 carbon atoms with ethylene and propylene being most commonly employed. Other body layers include for example poly(ethylene naphthalate), polycarbonate, poly(meth)acrylate (e.g., polymethyl methacrylate or "PMMA"), polyolefins (e.g., polypropylene or "PP"), polyesters (e.g., polyethylene terephthalate or "PET"), polyamides, polyimides, phenolic resins, cellulose diacetate, cellulose triacetate (TAC), polystyrene, styrene-acrylonitrile copolymers, cyclic olefin copolymers, epoxies, and the like. In some embodiments, the optional carrier film can include paper, release-coated paper, non-wovens, wovens (fabric), metal films, and metal foils.

Although the template can comprise a carrier film, the template layer is removed after the microoptical layer is transferred onto the receptor substrate (e.g. pane of glass).

Thus, once the microoptical layer is transferred onto the receptor substrate (e.g. pane of glass), there is no organic polymeric film substrate between the microoptical layer and the pane of glass. Further, the insulating glazing unit typically does not include any organic polymeric film substrates. Such organic polymeric film substrates typically have a thickness of at least 1 or 2 mils (about 25 or 50 micrometers).

Removable Template

The template layer 110 can be formed through embossing, replication processes, extrusion, casting, or surface structuring, for example. It is to be understood that the template layer 110 can have a structured surface 114 that may include nanostructures, microstructures, or hierarchical structures. In some embodiments, the template layer 110 can be compatible with patterning, actinic patterning, embossing, extruding, and coextruding.

Typically, the template layer 110 includes a photocurable material that can have a low viscosity during the replication process and then can be quickly cured to form a permanent crosslinked polymeric network "locking in" the replicated nanostructures, microstructures or hierarchical structures. Any photocurable resins known to those of ordinary skill in the art of photopolymerization can be used for the template layer 110. The resin used for the template layer 110 may be capable, when crosslinked, of releasing from the backfill layer 120 during the use of the disclosed transfer tapes, or should be compatible with application of a release layer and the process for applying the release layer.

Polymers that can be used as the template layer 110 also include the following: styrene acrylonitrile copolymers; styrene(meth)acrylate copolymers; polymethylmethacrylate; polycarbonate; styrene maleic anhydride copolymers; nucleated semi-crystalline polyesters; copolymers of polyethylenenaphthalate; polyimides; polyimide copolymers; polyetherimide; polystyrenes; syndiodactic polystyrene; polyphenylene oxides; cyclic olefin polymers; and copolymers of acrylonitrile, butadiene, and styrene. One preferable polymer is the Lustran SAN Sparkle material available from Ineos ABS (USA) Corporation. Polymers for radiation cured template layers 110 include cross linked acrylates such as multifunctional acrylates or epoxies and acrylated urethanes blended with mono- and multifunctional monomers.

Patterned structured template layers can be formed by depositing a layer of a radiation curable composition onto one surface of a radiation transmissive support to provide a layer having an exposed surface, contacting a master with a preformed surface bearing a pattern capable of imparting a three-dimensional microstructure of precisely shaped and located interactive functional discontinuities including distal surface portions and adjacent depressed surface portions into the exposed surface of the layer of radiation curable composition on said support under sufficient contact pressure to impart said pattern into said layer, exposing said curable composition to a sufficient level of radiation through the carrier to cure said composition while the layer of radiation curable composition is in contact with the patterned surface of the master. This cast and cure process can be done in a continuous manner using a roll of support, depositing a layer of curable material onto the support, laminating the curable material against a master and curing the curable material using actinic radiation. The resulting roll of support with a patterned, structured template disposed thereon can then be rolled up. This method is disclosed, for example, in U.S. Pat. No. 6,858,253 (Williams et al.).

For extrusion or embossed template layers, the materials making up the template layer can be selected depending on the particular topography of the top structured surface that is to be imparted. In general, the materials are selected such that the structure is fully replicated before the materials solidify. This will depend in part on the temperature at which the material is held during the extrusion process and the temperature of the tool used to impart the top structured surface, as well as on the speed at which extrusion is being carried out. Typically, the extrudable polymer used in the top layer has a $T_g$ of less than about 140° C., or a $T_g$ of from about 85° C. to about 120° C., in order to be amenable to extrusion replication and embossing under most operating conditions. In some embodiments, the optional carrier film and the template layer can be coextruded at the same time. This embodiment requires at least two layers of coextrusion: a top layer with one polymer and a bottom layer with another polymer. If the top layer comprises a first extrudable polymer, then the first extrudable polymer can have a $T_g$ of less than about 140° C. or a $T_g$ or of from about 85° C. to about 120° C. If the top layer comprises a second extrudable polymer, then the second extrudable polymer, which can function as the optional carrier film, has a $T_g$ of less than about 140° C. or a $T_g$ of from about 85° C. to about 120° C. Other properties such as molecular weight and melt viscosity should also be considered and will depend upon the particular polymer or polymers used. The materials used in the template layer should also be selected so that they provide good adhesion to the optional carrier film so that delamination of the two layers is minimized during the lifetime of the article.

The extruded or coextruded template layer can be cast onto a master roll that can impart patterned structure to the template layer. This can be done batch-wise or in a continuous roll-to-roll process. Additionally, the optional carrier film can be extruded onto the extruded or coextruded template layer. In some embodiments, both layers: optional carrier film and template layers can be coextruded at once.

Useful polymers that may be used as the template layer polymer include one or more polymers selected from the group consisting of styrene acrylonitrile copolymers; styrene (meth)acrylate copolymers; polymethylmethacrylate; styrene maleic anhydride copolymers; nucleated semi-crystalline polyesters; copolymers of polyethylenenaphthalate; polyimides; polyimide copolymers; polyetherimide; polystyrenes; syndiodactic polystyrene; polyphenylene oxides; and copolymers of acrylonitrile, butadiene, and styrene. Particularly useful polymers that may be used as the first extrudable polymer include styrene acrylonitrile copolymers known as TYRIL copolymers available from Dow Chemical; examples include TYRIL 880 and 125. Other particularly useful polymers that may be used as the template polymer include styrene maleic anhydride copolymer DYLARK 332 and styrene acrylate copolymer NAS 30, both from Nova Chemical. Also useful are polyethylene terephthalate blended with nucleating agents such as magnesium silicate, sodium acetate, or methylenebis(2,4-di-t-butylphenol) acid sodium phosphate.

Additional useful polymers include CoPENs (copolymers of polyethylenenaphthalate), CoPVN (copolymers of polyvinylnaphthalene) and polyimides including polyetherimide. Suitable resin compositions include transparent materials that are dimensionally stable, durable, weatherable, and readily formable into the desired configuration. Examples of suitable materials include acrylics, which have an index of refraction of about 1.5, such as PLEXIGLAS brand resin manufactured by Rohm and Haas Company; polycarbonates, which have an index of refraction of about 1.59; reactive materials such as thermoset acrylates and epoxy acrylates; polyethylene based ionomers, such as those marketed under the brand name of SURLYN by E. I. Dupont de Nemours and Co., Inc.; (poly)ethylene-co-acrylic acid; polyesters; polyurethanes; and cellulose acetate butyrates. The template layer may be prepared by casting directly onto an optional carrier film, such as disclosed in U.S. Pat. No. 5,691,846 (Benson). Polymers for radiation cured structures include cross linked acrylates such as multifunctional acrylates or epoxies and acrylated urethanes blended with mono- and multifunctional monomers.

The polymerizable composition used to prepare the template layer may be monofunctional or multifunctional (e.g., di-, tri-, and tetra-) in terms of radiation curable moieties. Examples of suitable monofunctional polymerizable precursors include styrene, alpha-methylstyrene, substituted styrene, vinyl esters, vinyl ethers, octyl (meth)acrylate, nonylphenol ethoxylate (meth)acrylate, isobornyl (meth)acrylate, isononyl (meth)acrylate, 2-(2-ethoxyethoxy)ethyl (meth) acrylate, 2-ethylhexyl (meth)acrylate, lauryl (meth)acrylate, beta-carboxyethyl (meth)acrylate, isobutyl (meth)acrylate, cycloaliphatic epoxide, alpha-epoxide, 2-hydroxyethyl (meth)acrylate, isodecyl (meth)acrylate, dodecyl (meth) acrylate, n-butyl (meth)acrylate, methyl (meth)acrylate, hexyl (meth)acrylate, (meth)acrylic acid, N-vinylcaprolactam, stearyl (meth)acrylate, hydroxyl functional caprolactone ester (meth)acrylate, isooctyl (meth)acrylate, hydroxyethyl (meth)acrylate, hydroxypropyl (meth)acrylate, hydroxyisopropyl (meth)acrylate, hydroxybutyl (meth) acrylate, hydroxyisobutyl (meth)acrylate, tetrahydrofuryl (meth)acrylate, and any combinations thereof.

Examples of suitable multifunctional polymerizable precursors include ethyl glycol di(meth)acrylate, hexanediol di(meth)acrylate, triethylene glycol di(meth)acrylate, tetraethylene glycol di(meth)acrylate, trimethylolpropane tri (meth)acrylate, trimethylolpropanepropane tri(meth)acrylate, glycerol tri(meth)acrylate, pentaerythritol tri(meth) acrylate, pentaerythritol tetra(meth)acrylate, neopentyl glycol di(meth)acrylate, bisphenol A di(meth)acrylate, poly (1,4-butanediol) di(meth)acrylate, any substituted, ethoxylated or propoxylated versions of the materials listed above, or any combinations thereof.

The polymerization reactions generally lead to the formation of a three-dimensional "crosslinked" macromolecular network and are also known in the art as negative-tone photoresists, as reviewed by Shaw et al., "Negative photoresists for optical lithography," IBM Journal of Research and Development (1997) 41, 81-94. The formation of the network may occur through either covalent, ionic, or hydrogen bonding, or through physical crosslinking mechanisms such as chain entanglement. The reactions can also be initiated through one or more intermediate species, such as free-radical generating photoinitiators, photosensitizers, photoacid generators, photobase generators, or thermal acid generators. The type of curing agent used depends on the polymerizable precursor used and on the wavelength of the radiation used to cure the polymerizable precursor. Examples of suitable commercially available free-radical generating photoinitiators include benzophenone, benzoin ether, and acylphosphine photoinitiators, such as those sold under the trade designations "IRGACURE" and "DAROCUR" from Ciba Specialty Chemicals, Tarrytown, N.Y. Other exemplary photoinitiators include 2,2-dimethoxy-2-phenylacetophenone (DMPAP), 2,2-dimethoxyacetophenone (DMAP), xanthone, and thioxanthone.

Co-initiators and amine synergists may also be included to improve curing rates. Suitable concentrations of the curing agent in the crosslinking matrix range from about 1 wt. % to about 10 wt. %, with particularly suitable concentrations ranging from about 1 wt. % to about 5 wt. %, based on the entire weight of the polymerizable precursor. The polymerizable precursor may also include optional additives, such as heat stabilizers, ultraviolet light stabilizers, free-radical scavengers, and combinations thereof. Examples of suitable commercially available ultraviolet light stabilizers include benzophenone-type ultraviolet light absorbers, which are available under the trade designation "UVINOL 400" from BASF Corp., Florham Park, N.J.; under the trade designation "CYASORB UV-1164" from Cytec Industries, West Patterson, N.J.; and under the trade designations "TINUVIN 900," and "TINUVIN 1130" from BASF Corp., Florham Park, N.J. Examples of suitable concentrations of ultraviolet light stabilizers in the polymerizable precursor range from about 0.1 wt. % to about 10 wt. %, with particularly suitable total concentrations ranging from about 1 wt. % to about 5 wt. %, relative to the entire weight of the polymerizable precursor.

Examples of suitable free-radical scavengers include hindered amine light stabilizer (HALS) compounds, hydroxylamines, sterically hindered phenols, and combinations thereof. Examples of suitable commercially available HALS compounds include the trade designated "TINUVIN 292" and "TINUVIN 123" from BASF Corp., Florham Park, N.J., and the trade designated "CYASORB UV-24" from Cytec Industries, West Patterson, N.J. Examples of suitable concentrations of free radical scavengers in the polymerizable precursor range from about 0.05 wt. % to about 0.25 wt. %.

The template layer 110 is typically removed from the cured backfill layer 120, to result in the final microoptical glazing. One method to reduce the adhesion of the backfill layer 120 to the template layer 110 is to apply an optional transfer layer 130 that can be a release coating as described above.

Release Layers

Reduction of the adhesion to any layer applied to it can be accomplished by application of a release layer or coating, and as such a release coating can be applied to any of the layers in the transfer film to facilitate release and can be used, for example, in a release liner. One method of applying a release coating to the surface of the support carrier film is with plasma deposition. An oligomer can be used to create a plasma cross-linked release coating. The oligomer may be in liquid or in solid form prior to coating. Typically the oligomer has a molecular weight greater than 1000. Also, the oligomer typically has a molecular weight less than 10,000 so that the oligomer is not too volatile. An oligomer with a molecular weight greater than 10,000 typically may be too non-volatile, causing droplets to form during coating. In one embodiment, the oligomer has a molecular weight greater than 3000 and less than 7000. In another embodiment, the oligomer has a molecular weight greater than 3500 and less than 5500. Typically, the oligomer has the properties of providing a low-friction surface coating. Suitable oligomers include silicone-containing hydrocarbons, reactive silicone containing trialkoxysilanes, aromatic and aliphatic hydrocarbons, fluorochemicals and combinations thereof. For example, suitable resins include, but are not limited to, dimethylsilicone, hydrocarbon based polyether, fluorochemical polyether, ethylene teterafluoroethylene, and fluorosilicones. Fluorosilane surface chemistry, vacuum deposition, and surface fluorination may also be used to provide a release coating.

Plasma polymerized thin films constitute a separate class of material from conventional polymers that can be used as release layers or coatings. In plasma polymers, the polymerization is random, the degree of cross-linking is extremely high, and the resulting polymer film is very different from the corresponding "conventional" polymer film. Thus, plasma polymers are considered by those skilled in the art to be a uniquely different class of materials and are useful in the disclosed articles. In addition, there are other ways to apply release coatings to the template layer, including, but not limited to, blooming, coating, coextrusion, spray coating, electrocoating, or dip coating.

The release coating or layer may be a fluorine-containing material, a silicon-containing material, a fluoropolymer, a silicone polymer, or a poly(meth)acrylate ester derived from a monomer comprising an alkyl (meth)acrylate having an alkyl group with 12 to 30 carbon atoms. In one embodiment, the alkyl group can be branched. Illustrative examples of useful fluoropolymers and silicone polymers can be found in U.S. Pat. No. 4,472,480 (Olson), U.S. Pat. Nos. 4,567,073 and 4,614,667 (both Larson et al.). Illustrative examples of a useful poly(meth)acrylate ester can be found in U.S. Pat. Appl. Publ. No. 2005/118352 (Suwa). The removal of the liner shouldn't negatively alter the surface topology of the transfer layer.

Backfill Layer

The material of the backfill layer 120 typically can meet several requirements. First, it can conform to the structured surface 114 of the template layer 110 onto which it is coated. This means that the viscosity of the coating solution should be low enough to be able to flow into very small features without the entrapment of air bubbles, which will lead to good fidelity of the replicated structure. If it is solvent based, it should be coated from a solvent that does not dissolve the underlying template layer 110, which would cause cracking, or other detrimental defects of the backfill layer 120. It is desirable that the solvent has a boiling point below that of the template layer 110 glass transition temperature. Preferably, isopropanol, butyl alcohol and other alcoholic solvents have been used. Second, the material should cure with sufficient mechanical integrity (e.g., "green strength"). If the material of the backfill layer 120 does not have enough green strength after curing, the transfer structured surface 124 features of the backfill layer 120 can slump and the replication fidelity can degrade. Third, for some embodiments, the refractive index of the cured material should be tailored to produce the proper optical effect. Fourth, the material of the backfill layer 120 should be thermally stable (e.g., showing minimal cracking, blistering, or popping) above the temperature of the upper range of the future process steps.

Polymers are known in the art that contain a combination of organic and inorganic moieties. The organic moiety in the polymer may be used for curability, flexibility, etc, while the inorganic moiety may be used for higher heat resistance, weatherability, durability, etc. One such polymer is available from Nagase Co., Osaka, Japan under the trade designation "SA-250P". The polymer can be cured using methods known in the art, such as ultraviolet irradiation combined a photoinitiator that absorbs ultraviolet light, for example. After curing, this polymer has a refractive index of ~1.6, and a high transmittance (T>88%) as measured by a refractometer and a UV-Vis spectrophotometer, respectively. Other curable polymers that contain a combination of organic and inorganic moieties have a refractive index of about 1.50 after curing.

In some cases, the highly branched organosilicon material comprises highly branched organosilicon oligomers, highly branched organosilicon polymers, or combinations thereof. The backfill layer 120 may be capable of being cured by actinic radiation such as ultraviolet (UV) radiation, ionizing radiation, thermally, or by a combination thereof. The highly branched organosilicon material may further include inorganic particles, such as glasses or ceramics that can be index-matched to the organosilicon material, forming a composite material, such as a nanoparticle-filled silsesquioxane.

The backfill material may comprise or consist of a class of the highly branched organosilicon oligomers and polymers of a general formula (as below) which can be further reacted to form crosslinked networks by homo-condensation of Si—OH groups, hetero-condensation with the remaining hydrolyzable groups (e.g. alkoxy), and/or by reactions of the functional organic groups (e.g. ethylenically unsaturated such as vinyl, acrylate, or methacrylate). This class of materials is derived primarily from organosilanes of a general formula:

$R_xSiZ_{4-x}$, wherein

R is selected from hydrogen, substituted or unsubstituted $C_1$-$C_{20}$ alkyl, substituted or unsubstituted $C_2$-$C_{10}$ alkylene, substituted or unsubstituted $C_2$-$C_{20}$ alkenylene, $C_2$-$C_{20}$ alkynylene, substituted or unsubstituted $C_3$-$C_{20}$ cycloalkyl, substituted or unsubstituted $C_6$-$C_{20}$ aryl, substituted or unsubstituted $C_6$-$C_{20}$ arylene, a substituted or unsubstituted $C_7$ to $C_{20}$ arylalkyl group, a substituted or unsubstituted $C_1$ to $C_{20}$ heteroalkyl group, a substituted or unsubstituted $C_2$ to $C_{20}$ heterocycloalkyl group, and/or combinations of these.

Z is a hydrolyzable group, such as halogen (containing the elements F, Br, Cl, or I), $C_1$-$C_{20}$ alkoxy, $C_5$-$C_{20}$ aryloxy, and/or combinations of these.

The majority of the composition may consist of $RSiO_{3/2}$ units thus the class of materials is often called silsesquioxanes (or T-resins), however they may also contain mono- ($R_3Si$—$O_{1/2}$), di-($R_2SiO_{2/2}$) and tetrafunctional groups ($Si$—$O_{4/2}$). Organically-modified disilanes of the formula:

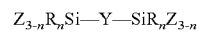

$Z_{3-n}R_nSi$—Y—$SiR_nZ_{3-n}$ are often used in the hydrolyzable compositions to further modify the properties of the materials (to form the so-called bridged silsesquioxanes), the R and Z groups are defined above. The materials can be further formulated and reacted with metal alkoxides ($M(OR)_m$) to form metallo-silsesquioxanes.

The backfill material may comprise or consist of highly branched organosilicon oligomers and polymers of a general formula:

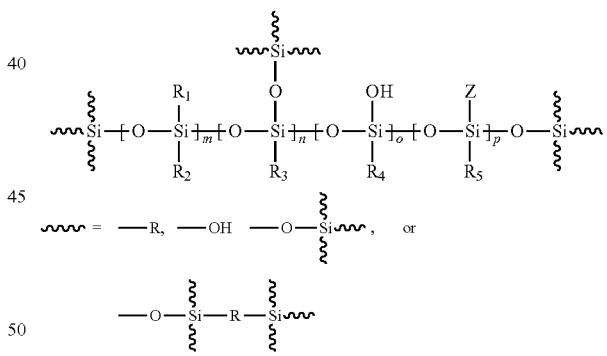

$R_1$, $R_2$, $R_3$, $R_4$, and $R_5$ are independently selected from hydrogen, substituted or unsubstituted $C_1$-$C_{20}$ alkyl, substituted or unsubstituted $C_2$-$C_{10}$ alkylene, substituted or unsubstituted $C_2$-$C_{20}$ alkenylene, $C_2$-$C_{20}$ alkynylene, substituted or unsubstituted $C_3$-$C_{20}$ cycloalkyl, substituted or unsubstituted $C_6$-$C_{20}$ aryl, substituted or unsubstituted $C_6$-$C_{20}$ arylene, a substituted or unsubstituted $C_7$ to $C_{20}$ arylalkyl group, a substituted or unsubstituted $C_1$ to $C_{20}$ heteroalkyl group, a substituted or unsubstituted $C_2$ to $C_{20}$ heterocycloalkyl group, and/or combinations of these;

Z is a hydrolyzable group, such as halogen(containing the elements F, Br, Cl, or I), $C_1$-$C_{20}$ alkoxy, C—$C_{20}$ aryloxy, and/or combinations of these.

m is an integer from 0 to 500;

n is an integer from 1 to 500;

p is an integer from 0 to 500;

q is an integer from 0 to 100.

As used herein, the term "substituted" refers to one substituted with at least a substituent selected from the group consisting of a halogen (containing the elements F, Br, Cl, or I), a hydroxy group, an alkoxy group, a nitro group, a cyano group, an amino group, an azido group, an amidino group, a hydrazino group, a hydrazono group, a carbonyl group, a carbamyl group, a thiol group, an ester group, a carboxyl group or a salt thereof, a sulfonic acid group or a salt thereof, a phosphoric acid group or a salt thereof, alkyl group, a $C_2$ to $C_{20}$ alkenyl group, a $C_2$ to $C_{20}$ alkynyl group, $C_6$ to $C_{30}$ aryl group, a $C_7$ to $C_{13}$ arylalkyl group, a $C_1$ to $C_4$ oxyalkyl group, a $C_1$ to $C_{20}$ heteroalkyl group, a $C_3$ to $C_{20}$ heteroarylalkyl group, a $C_3$ to $C_{30}$ cycloalkyl group, a $C_3$ to $C_{15}$ cycloalkenyl group, a $C_6$ to $C_{15}$ cycloalkynyl group, a heterocycloalkyl group, and a combination thereof, instead of hydrogen of a compound.

The resulting highly branched organosilicon polymer has a molecular weight in a range from 150 to 300,000 Da or preferably in a range from 150 to 30,000 Da.

Materials that may be used for the backfill include polysiloxane resins, polysilazanes, polyimides, silsesquioxanes of bridge or ladder-type, silicones, and silicone hybrid materials and many others. These molecules typically have an inorganic component which leads to high dimensional stability, mechanical strength, and chemical resistance, and an organic component that helps with solubility and reactivity.

In many embodiments the thermally stable molecular species includes silicon, hafnium, strontium, titanium or zirconium. In some embodiments the thermally stable molecular species includes a metal, metal oxide or metal oxide precursor. Metal oxide precursors may be used in order to act as an amorphous "binder" for inorganic nanoparticles, or they may be used alone.

The backfill compositions described herein may comprise inorganic nanoparticles. These nanoparticles can be of various sizes and shapes. The nanoparticles can have an average particle diameter less than about 1000 nm, less than about 100 nm, less than about 50 nm, or less than about 35 nm. The nanoparticles can have an average particle diameter from about 3 nm to about 50 nm, or from about 3 nm to about 35 nm, or from about 5 nm to about 25 nm. If the nanoparticles are aggregated, the maximum cross sectional dimension of the aggregated particle can be within any of these ranges, and can also be greater than about 100 nm. "Fumed" nanoparticles, such as silica and alumina, with primary size less than about 50 nm, may also be used, such as CAB-OSPERSE PG 002 fumed silica, CAB-O-SPERSE 2017A fumed silica, and CAB-OSPERSE PG 003 fumed alumina, available from Cabot Co. Boston, Mass. Their measurements can be based on transmission electron microscopy (TEM). Nanoparticles can be substantially fully condensed. Fully condensed nanoparticles, such as the colloidal silicas, typically have substantially no hydroxyls in their interiors. Non-silica containing fully condensed nanoparticles typically have a degree of crystallinity (measured as isolated particles) greater than 55%, preferably greater than 60%, and more preferably greater than 70%. For example, the degree of crystallinity can range up to about 86% or greater. The degree of crystallinity can be determined by X-ray diffraction techniques. Condensed crystalline (e.g. zirconia) nanoparticles have a high refractive index whereas amorphous nanoparticles typically have a lower refractive index.

Various shapes of the inorganic or organic nanoparticles may be used, such as sphere, rod, sheet, tube, wire, cube, cone, tetrahedron, and the like.

The size of the particles is generally chosen to create a desired optical effect such as transparence or scattering. The nanomaterial composition can also impart various optical properties (i.e. refractive index, birefringence), electrical properties (e.g. conductivity), mechanical properties (e.g. toughness, pencil hardness, scratch resistance) or a combination of these properties. It may be desirable to use a mix of organic and inorganic oxide particle types to optimize an optical or material property and to lower total composition cost.

Examples of suitable inorganic nanoparticles include metal nanoparticles or their respective oxides, including the elements zirconium (Zr), titanium (Ti), hafnium (Hf), aluminum (Al), iron (Fe), vanadium (V), antimony (Sb), tin (Sn), gold (Au), copper (Cu), gallium (Ga), indium (In), chromium (Cr), manganese (Mn), cobalt (Co), nickel (Ni), zinc (Zn), yttrium (Y), niobium (Nb), molybdenum (Mo), technetium (Te), ruthenium (Ru), rhodium (Rh), palladium (Pd), silver (Ag), cadmium (Cd), lanthanum (La), tantalum (Ta), tungsten (W), rhenium (Rh), osmium (Os), iridium (Ir), platinum (Pt), and any combinations thereof.

Examples of suitable inorganic nanoparticles include elements known as rare earth elements and their oxides, such as lanthanum (La), cerium ($CeO_2$), praseodymium ($Pr_6O_{11}$), neodymium ($Nd_2O_3$), samarium ($Sm_2O_3$), europium ($Eu_2O_3$), gadolinium ($Gd_2O_3$), terbium ($Tb_4O_7$), dysprosium ($Dy_2O_3$), holmium ($Ho_2O_3$), erbium ($Er_2O_3$), thulium ($Tm_2O_3$), ytterbium ($Yb_2O_3$) and lutetium ($Lu_2O_3$).

The nanoparticles are typically treated with a surface treatment agent. Surface-treating the nano-sized particles can provide a stable dispersion in the polymeric resin. Preferably, the surface-treatment stabilizes the nanoparticles so that the particles will be well dispersed in a substantially homogeneous composition. Furthermore, the nanoparticles can be modified over at least a portion of its surface with a surface treatment agent so that the stabilized particle can copolymerize or react with the parts of the composition during curing. In general, a surface treatment agent has a first end that will attach to the particle surface (covalently, ionically or through strong physisorption) and a second end that imparts compatibility of the particle with the composition and/or reacts with composition during curing. Examples of surface treatment agents include alcohols, amines, carboxylic acids, sulfonic acids, phosphonic acids, silanes and titanates. The preferred type of treatment agent is determined, in part, by the chemical nature of the metal oxide surface. Silanes are preferred for silica and other for siliceous fillers. Silanes and carboxylic acids are preferred for metal oxides such as zirconia. The surface modification can be done either subsequent to mixing with the monomers or after mixing. It is preferred in the case of silanes to react the silanes with the particle or nanoparticle surface before incorporation into the composition. The required amount of surface modifier is dependent upon several factors such particle size, particle type, modifier molecular weight, and modifier type. In general it is preferred that approximately a monolayer of modifier is attached to the surface of the particle. The attachment procedure or reaction conditions required also depend on the surface modifier used. For silanes, it is preferred to surface treat at elevated temperatures under acidic or basic conditions for from 1-24 hr approximately. Surface treatment agents such as carboxylic acids may not require elevated temperatures or extended time.

Representative embodiments of surface treatment agents suitable for the compositions include compounds such as, for example, isooctyl trimethoxy-silane, N-(3-triethoxysilylpropyl) methoxyethoxyethoxyethyl carbamate (PEG3TES), N-(3-triethoxysilylpropyl) methoxyethoxyethoxyethyl carbamate (PEG2TES), 3-(methacryloyloxy)propyltrimethoxysilane, 3-acryloxypropyltrimethoxysilane, 3-(methacryloyloxy)propyltriethoxysilane, 3-(methacryloyloxy) propylmethyldimethoxysilane, 3-(acryloyloxypropyl)methyldimethoxysilane, 3-(methacryloyloxy)propyldimethylethoxysilane, 3-(methacryloyloxy) propyldimethylethoxysilane, vinyldimethylethoxysilane, phenyltrimethoxysilane, n-octyltrimethoxysilane, dodecyltrimethoxysilane, octadecyltrimethoxysilane, propyltrimethoxysilane, hexyltrimethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri-t-butoxysilane, vinyltris-isobutoxysilane, vinyltriisopropenoxysilane, vinyltris(2-methoxyethoxy) silane, styrylethyltrimethoxysilane, mercaptopropyltrimethoxysilane, 3-5 glycidoxypropyltrimethoxysilane, acrylic acid, methacrylic acid, oleic acid, stearic acid, dodecanoic acid, 2-[2-(2-methoxyethoxy) ethoxy]acetic acid (MEEAA), beta-carboxyethylacrylate, 2-(2-methoxyethoxy)acetic acid, methoxyphenyl acetic acid, and mixtures thereof. Further, a proprietary silane surface modifier, commercially available from OSI Specialties, Crompton South Charleston, W.Va. under the trade designation "Silquest A1230", has been found particularly suitable.

In some embodiments, the backfill layer includes a photocurable (e.g. polysiloxane) material that can have a low viscosity during the replication process and then can be quickly cured to form a permanent crosslinked polymeric network "locking in" the replicated nanostructures, microstructures or hierarchical structures.

Patterning

The transfer tape, microoptical glazing, and insulated glass units can comprise microoptical pattern such as depicted in FIGS. 4 and 5. In some embodiments, the backfill layer is disposed in a pattern on the structured surface of the template layer. Alternatively, and more typically in combination thereof, the adhesive layer is disposed in a pattern on the microstructured surface of the (e.g. patterned) backfill layer. In some embodiments, the area fraction of the structured surface regions at the top edge is >90% and the area fraction of the structured surface regions at an opposing bottom edge is <10%. The backfill layer material and/or the adhesive can be applied by printing or otherwise depositing material in a pattern, such as by screen printing, flexo printing, ink-jet printing, gravure printing, and the like, such as by techniques known to those of skill in the art.

When the backfill layer and adhesive are patterned, the backfill layer and adhesive layer can be discontinuous along the x-axis, discontinuous along the y-axis (e.g. vertical or horizontal strip pattern) or discontinuous along both the x-axis and y-axis (e.g. islands) such as depicted in FIGS. 1B and 2C.

In another embodiment, a method of making a transfer tape is described wherein the backfill layer and adhesive layer are continuous along the x-axis and y-axis when the transfer tape is made. Hence, the backfill layer and adhesive layer are not pattern coated. However, the transfer tape is (e.g. score) cut such that once the uncut portion(s) is removed, the transfer tape comprises a patterned backfill layer and adhesive, such as depicted in FIG. 1B.

With reference to FIG. 8A, the method comprises providing transfer tape 801 comprising a (first) template comprising an optional carrier film 840 and template layer 810 and a microoptical layer disposed at least a portion of the first template. The microoptical layer comprises a cured backfill layer 820 wherein the microoptical layer has a structured surface 814 and an opposing surface. An adhesive layer 850 is disposed on the opposing surface of the microoptical layer. In typical embodiments, a release liner 870 is provided on the opposing surface of the adhesive layer 850. The transfer tape having the continuous backfill layer 820 and continuous adhesive layer 850 disposed on a continuous release liner 870 is then subject to score cutting through the first template 802, cured backfill layer 820, and adhesive layer 850 such that cut portions remain of the release liner and the uncut portion can be removed (e.g. as a single continuous piece). The score cutting can be conducted by any suitable means such as laser cutting and rotary die cutting.

In some embodiments, the opposing surface of the microoptical layer is a microstructured surface 822. In this embodiment, the adhesive 850 has a refractive index that differs from the backfill layer. Although the microstructured surface 822 is depicted, this aspect is optional with regard to the score cut transfer tape With reference to FIG. 8B, transfer tape 801 or 802 can be utilized in methods of making microoptical glazing. Such method comprises providing transfer tape 801, having a plurality of scored portions disposed on a release liner 870, removing the release liner 870, and bonding adhesive 850 of the score cut portions to a pane of glass 880. The method further comprises removing the first template 840 comprising an optional carrier film 840 and template layer 810. When transfer tape 802 is utilized, the uncut portion(s) of first template 840 together with the microoptical layer 820 and adhesive 850 (designated by the portions with an "X") is removed (e.g. as a single continuous piece) prior to bonding adhesive 850 to the pane of glass 880. Adhesive 850 is typically index matched to the pane of glass 840.

Release Liner

The optional release liner 170 can be a release liner that can protect the patterned structured layer and/or protect adhesive layer (e.g. 150, 850) during handling and can be easily removed, when desired, for transfer of the structured layer or part of the structured layer to a receptor substrate. Exemplary liners useful for the disclosed patterned structured tape are disclosed in PCT Pat. Appl. Publ. No. WO 2012/082536 (Baran et al.).

The liner may be flexible or rigid. Preferably, it is flexible. A suitable liner (preferably, a flexible liner) is typically at least 0.5 mil (12.7 micrometers) thick, and typically no more than 20 mils (508 micrometers) thick. The liner may be a backing with a release coating disposed on its first surface. Optionally, a release coating can be disposed on its second surface. If this backing is used in a transfer article that is in the form of a roll, the second release coating has a lower release value than the first release coating. Suitable materials that can function as a rigid liner include metals, metal alloys, metal-matrix composites, metalized plastics, inorganic glasses and vitrified organic resins, formed ceramics, and polymer matrix reinforced composites.

Exemplary liner materials include paper and polymeric materials. For example, flexible backings include densified Kraft paper (such as those commercially available from Loparex North America, Willowbrook, Ill.), poly-coated paper such as polyethylene coated Kraft paper, and polymeric film. Suitable polymeric films include polyester, polycarbonate, polypropylene, polyethylene, cellulose, polyamide, polyimide, polysilicone, polytetrafluoroethylene, polyethylenephthalate, polyvinylchloride, polycarbonate, or combinations thereof. Nonwoven or woven liners may also be useful. Embodiments with a nonwoven or woven liner could incorporate a release coating. CLEARSIL T50 Release liner; silicone coated 2 mil (about 50 micrometers) polyester film liner, available from Solutia/CP Films, Martinsville, Va., and LOPAREX 5100 Release Liner, fluorosilicone-coated 2 mil (about 50 micrometers) polyester film liner available from Loparex, Hammond, Wis., are examples of useful release liners.

Other Additives

Various additives, as known in the art, may be included in any of the layers of the transfer tape such as antioxidants, stabilizers, inhibitors, and the like to prevent premature curing during the process of storage, shipping and handling of the film.

Receptor Substrate

A particular advantage of the transfer films and the associated process of applying the transfer films, is the ability to impart structure to receptor surfaces with large surfaces, such as architectural glass. The large dimensions of the lamination transfer films are possible by using a combination of roll-to-roll processing and a cylindrical master template. An additional advantage of the transfer process disclosed herein is the ability to impart structure to receptor surfaces that are not planar. The receptor substrate can be curved, bent twisted, or have concave or convex features, due to the flexible format of the transfer tape. Receptor substrates may include, for example, automotive glass, sheet glass, flexible electronic substrates such as circuitized flexible film, display backplanes, solar glass, metal, polymers, polymer composites, and fiberglass. Still further, an additional advantage can be the ability to pattern the transfer layers by printing or otherwise depositing material in a pattern on the template films, by techniques known to those of skill in the art, as described elsewhere.

Unless otherwise indicated, all numbers in the description and the claims expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviations found in their respective testing measurements.

The recitation of numerical ranges by endpoints includes all numbers subsumed within that range (e.g. a range from 1 to 5 includes, for instance, 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above those other elements.

As used herein, when an element, component or layer for example is described as forming a "coincident interface" with, or being "on" "connected to," "coupled with" or "in contact with" another element, component or layer, it can be directly on, directly connected to, directly coupled with, in direct contact with, or intervening elements, components or layers may be on, connected, coupled or in contact with the particular element, component or layer, for example. When an element, component or layer for example is referred to as being "directly on," "directly connected to," "directly coupled with," or "directly in contact with" another element, there are no intervening elements, components or layers for example.

The term "actinic radiation" refers to wavelengths of radiation that can crosslink or cure polymers and can include ultraviolet, visible, and infrared wavelengths and can include digital exposures from rastered lasers, thermal digital imaging, and electron beam scanning The term "polysiloxanes" refers to highly branched oligomeric or polymeric organosilicon compounds that include silicon-oxygen bonds and may include carbon-carbon and/or carbon-hydrogen bonds.

The following is a list of exemplary embodiments of the present description.

Embodiment 1 is a transfer tape, comprising:
a removable template layer having a structured surface;
a backfill layer having a first surface disposed on at least a portion of the structured surface of the template layer, and a second surface opposite the structured surface wherein the second surface comprises a microstructured surface;
a layer disposed on at least a portion of the microstructured surface, wherein the layer has a refractive index that differs from the backfill layer,
wherein the microstructured surface together with the layer disposed on at least a portion of the microstructured surface is an anisotropic diffuser.

Embodiment 2 is the transfer tape of Embodiment 1, wherein the diffuser has an optical haze of 20 to 85 percent and an optical clarity of no more than 50 percent.

Embodiment 3 is the transfer tape of Embodiment 1, wherein the diffuser has an optical haze of 20 to 75 percent and an optical clarity of 5 to 40 percent.

Embodiment 4 is the transfer tape of Embodiment 1, wherein the diffuser has an optical haze of 25 to 65 percent and an optical clarity of 7 to 37 percent.

Embodiment 5 is the transfer tape of Embodiment 1, wherein the diffuser has an optical haze of 30 to 60 percent and an optical clarity of 10 to 35 percent.

Embodiment 6 is the transfer tape of any of the previous Embodiments, wherein the backfill layer has a first refractive index, the layer has a second refractive index, and the first refractive index is higher than the second refractive index by at least 0.05.

Embodiment 7 is the transfer tape of Embodiment 6, wherein the first refractive index is higher than the second refractive index by at least 0.1.

Embodiment 8 is the transfer tape of any of the previous Embodiments, wherein the microstructured surface has a surface angle distribution having a first half width at half maximum (HWHM) in a first direction and a second surface angle distribution having a second HWHM in a second direction different from the first direction, wherein the first HWHM is different from the second HWHM.

Embodiment 9 is the transfer tape of Embodiment 8, wherein a ratio of the first HWHM to the second HWHM is greater than 1.1.

Embodiment 10 is the transfer tape of any of the previous Embodiments, wherein the microstructured surface is more diffusive along a first direction and less diffusive along a second direction orthogonal to the first direction.

Embodiment 11 is the transfer tape of Embodiment 10, where the structured surface comprises elements extending in the first direction.

Embodiment 12 is the transfer tape of Embodiment 10, wherein the structured surface is adapted to redirect light along the second direction.

Embodiment 13 is the transfer tape of any of the previous Embodiments, wherein the microstructured surface comprises asymmetric microstructures having an in-plane aspect ratio of greater than 1.2.

Embodiment 14 is the transfer tape of any of the previous Embodiments, wherein the microstructured surface comprises lenticular structures.

Embodiment 15 is the transfer tape of any of the previous Embodiments, wherein the microstructured surface comprises approximately semi-ellipsoidal or approximately semi-biconic structures.

Embodiment 16 is the transfer tape of any of the previous Embodiments, wherein the microstructured surface comprises randomly or pseudo-randomly distributed structures.

Embodiment 17 is the transfer tape of any of the previous Embodiments, wherein at least 80 percent of the microstructured surface has a slope magnitude greater than about 1 degree.

Embodiment 18 is the transfer tape of any of the previous Embodiments, wherein at least 90 percent of the microstructured surface has a slope magnitude greater than about 1 degree.

Embodiment 19 is the transfer tape of any of the previous Embodiments, wherein less than 2 percent of the microstructured surface has a slope magnitude less than 1 degree.

Embodiment 20 is the transfer tape of any of the previous Embodiments, wherein the layer comprises an adhesive.

Embodiment 21 is the transfer tape of Embodiment 20, wherein the adhesive comprises a polydiorganosiloxane polyoxamide copolymer.

Embodiment 22 is the transfer tape of any of the previous Embodiments, wherein the backfill layer has a refractive index greater than the layer.

Embodiment 23 is the transfer tape of Embodiment any of the previous Embodiments, wherein the backfill material comprise a polysiloxane material.

Embodiment 24 is the transfer tape of any of the previous Embodiments further comprising a carrier film disposed on a planar surface of the template layer opposite the structured surface.

Embodiment 25 is the transfer tape of any of the previous Embodiments further comprising a transfer layer disposed between the structured surface of the template layer and the backfill layer.

Embodiment 26 is the transfer tape of any of the previous Embodiments, wherein the transfer layer comprises a release coating.

Embodiment 27 is the transfer tape of any of the previous Embodiments, wherein the structured surface comprises a microoptical refractive surface.

Embodiment 28 is the transfer tape of any of the previous Embodiments, wherein the structured surface comprises surface features greater than about 10 micrometers in height.

Embodiment 29 is the transfer tape of any of the previous Embodiments, wherein the backfill layer is disposed in a pattern on the structured surface of the template layer.

Embodiment 30 is the transfer tape of any of the previous Embodiments, wherein the layer is disposed in a pattern on the microstructured surface of the backfill layer.

Embodiment 31 is the transfer tape of Embodiment 29 or 30, wherein the pattern comprises a plurality of islands, lines, or a combination of islands and lines.

Embodiment 32 is a microoptical glazing comprising:
 a pane of glass having a major surface;
 a microoptical layer bonded to at least a portion of the major surface, the microoptical layer comprising a cured backfill layer wherein the microoptical layer has a structured surface and opposing microstructured surface, and a layer adjacent the microstructured surface having a refractive index that differs from the backfill layer,
 wherein the microstructured surface together with the layer adjacent the microstructured surface is an anisotropic diffuser.

Embodiment 33 is the microoptical glazing of Embodiment 32 wherein the layer adjacent the microstructured surface is an adhesive and the adhesive bonds the microoptical layer to the major surface of the pane of glass.

Embodiment 34 is the microoptical glazing of any of Embodiments 32 to 33, wherein there is no organic polymeric film substrate between the microoptical layer and the pane of glass.

Embodiment 35 is the microoptical glazing of any of Embodiments 32 to 34, further characterized by any one or combination of Embodiments 2 to 31.

Embodiment 36 is a microoptical glazing comprising:
 a pane of glass having a major surface;
 a microoptical layer bonded to at least a portion of the major surface, and
 a microstructured interface adjacent a layer having a different refractive index, the microstructured interface proximate the microoptical layer;
 wherein for an input angle ranging from 30° to 60° the microoptical glazing redirects upwards at least 80% of daylight and does not exhibit a solar column, and
 wherein the microstructured interface comprises asymmetric structures and is adapted to anisotropically diffuse visible light.

Embodiment 37 is the microoptical glazing of Embodiment 36, wherein the microstructured interface has an optical haze of 20 to 85 percent and an optical clarity of no more than 50 percent.

Embodiment 38 is the microoptical glazing of Embodiment 36, wherein the microstructured interface has an optical haze of 20 to 75 percent and an optical clarity of 5 to 40 percent.

Embodiment 39 is the microoptical glazing of Embodiment 36, wherein the microstructured interface has an optical haze of 25 to 65 percent and an optical clarity of 7 to 37 percent.

Embodiment 40 is the microoptical glazing of Embodiment 36, wherein the microstructured interface has an optical haze of 30 to 60 percent and an optical clarity of 10 to 35 percent.

Embodiment 41 is the microoptical glazing of any of the previous Embodiments directed to microoptical glazings, wherein the microstructured interface has a surface angle distribution having a first half width at half maximum (HWHM) in a first direction and a second surface angle distribution having a second HWHM in a second direction different from the first direction, wherein the first HWHM is different from the second HWHM.

Embodiment 42 is the microoptical glazing of Embodiment 41, wherein a ratio of the first HWHM to the second HWHM is greater than 1.1 and less than about 10.

Embodiment 43 is the microoptical glazing of any of the previous Embodiments directed to microoptical glazings, wherein the microstructured interface is more diffusive along a first direction and less diffusive along a second direction orthogonal to the first direction.

Embodiment 44 is the microoptical glazing of any of the previous Embodiments directed to microoptical glazings, wherein the microstructured interface comprises lenticular structures.

Embodiment 45 is the microoptical glazing of any of the previous Embodiments directed to microoptical glazings, wherein the microstructured interface comprises approximately semi-ellipsoidal or approximately semi-biconic structures.

Embodiment 46 is the microoptical glazing of any of the previous Embodiments directed to microoptical glazings, wherein the microstructured interface comprises randomly or pseudo-randomly distributed structures.

Embodiment 47 is the microoptical glazing of any of the previous Embodiments directed to microoptical glazings, wherein at least 80 percent of the microstructured interface has a slope magnitude greater than about 1 degree.

Embodiment 48 is the microoptical glazing of any of the previous Embodiments directed to microoptical glazings, wherein at least 90 percent of the microstructured interface has a slope magnitude greater than about 1 degree.

Embodiment 49 is the microoptical glazing of any of the previous Embodiments directed to microoptical glazings, wherein less than 2 percent of the microstructured interface has a slope magnitude less than 1 degree.

Embodiment 50 is the microoptical glazing of any of the previous Embodiments directed to microoptical glazings, wherein the layer is an adhesive layer and the microstructured interface is between a cured resin layer and the adhesive layer, the cured resin layer having a refractive index greater than the adhesive layer by at least 0.05.

Embodiment 51 is the microoptical glazing of any of the previous Embodiments directed to microoptical glazings, wherein the layer is an air layer and the microstructured interface is between a cured resin layer and the air layer.

Embodiment 52 is an insulated glazing unit, comprising:
a pane of glass having a sun-facing pane exterior surface separated by a gap from a pane of glass having a room-facing exterior surface, each pane having an interior surface adjacent the gap; and
a microoptical layer bonded to at least a portion of an interior surface of a pane of glass, the microoptical layer comprising a cured backfill layer, wherein the microoptical layer has a structured surface and an opposing microstructured surface adjacent a layer having a refractive index that differs from the backfill layer, wherein the microstructured surface together with the layer is an anisotropic diffuser.

Embodiment 53 is the insulated glazing unit of Embodiment 52, wherein the layer adjacent the microstructured surface is an adhesive and the adhesive bonds the microoptical layer to the major surface of the pane of glass.

Embodiment 54 is the insulated glazing unit of Embodiment 52 or Embodiment 53, further characterized by any one or combination of Embodiments 2 to 31.

Embodiment 55 is an insulated glazing unit, comprising
a pane of glass having a sun-facing pane exterior surface separated by a gap from a pane of glass having a room-facing exterior surface, each pane having an interior surface adjacent the gap; and
a microoptical layer disposed on an interior surface of the insulated glazing unit; and
a microstructured interface disposed between the microoptical layer and the room-facing exterior surface, the microstructured interface comprising asymmetric structures, wherein the microstructured interface is adapted to anisotropically diffuse visible light.

Embodiment 56 is the insulated gazing unit of Embodiment 55, further characterized by any one or combination of Embodiments 36 to 51.

Embodiment 57 is the insulated glazing unit of Embodiment 55 or 56, wherein the microoptical layer has a structured surface and an opposing planar surface, wherein the planar surface is bonded to a microstructured interface of an interior sun-facing surface of the pane of glass with an adhesive.

Embodiment 58 is the insulated glazing unit of Embodiment 55 or 56, wherein the microoptical layer has a structured surface and an opposing planar surface and the microstructured interface is disposed on the exterior room-facing surface of the pane of glass.

Embodiment 59 is the insulated glazing unit of any of Embodiments 55 to 58, wherein there is no organic polymeric film substrate between the microoptical layer and the pane of glass.

Embodiment 60 is the insulating glazing unit of any of Embodiments 55 to 59, wherein the structured surface is adjacent a gas filling the gap, such that sunlight passing through the outside surface is refracted by the structured surface before passing through the inside surface.

Embodiment 61 is the insulated glazing unit of Embodiments 55 to 60, further characterized by any one or combination of Embodiments 20 to 31.

Embodiment 62 is a method of making a transfer tape comprising:
providing a first template having a structured surface,
providing a curable backfill layer on the structured surface such that the curable backfill layer has a major surface conforming with the structured surface of the first template and an opposing planar surface;
contacting the planar surface of the curable backfill layer with a second template; wherein the second template comprises a microstructured surface having asymmetric structures; and
curing the backfill material thereby forming a cured backfill layer having a structured surface and opposing microstructured surface.

Embodiment 63 is the method of Embodiment 62, further comprising removing the second template layer.

Embodiment 64 is the method of any of Embodiments 62 to 63, further comprising providing a layer on the microstructured surface of the cured backfill layer, wherein the layer has a different refractive index than the cured backfill layer.

Embodiment 65 is the method of Embodiment 64, wherein the layer provided on the microstructured surface of the cured backfill layer is an adhesive.

Embodiment 66 is the method of Embodiment 65 further comprising providing a removable release liner on the opposing surface of the adhesive.

Embodiment 67 is the method of any of Embodiments 62 to 66, wherein the structured surface comprises a plurality of peaks and valleys.

Embodiment 68 is the method of Embodiment 67, wherein the backfill layer has a thickness greater than the maximum height of the peaks.

Embodiment 69 is the method of any of Embodiments 62 to 68, the transfer tape further characterized by any one or combination of Embodiments 1 to 31.

Embodiment 70 is a method of making microoptical glazing comprising:
providing a transfer tape, the transfer tape comprising
 a first template having a structured surface,
 a curable backfill layer on the structured surface such that the curable backfill layer has a major surface conforming with the structured surface of the first template and an opposing surface; and
 a second template having a microstructured surface disposed in contact with the opposing surface of the backfill layer, the microstructured surface comprising asymmetric structures;
removing the second template layer;
bonding the cured microstructured backfill layer to a pane of glass with an adhesive, the adhesive having a different refractive index than the backfill layer.

Embodiment 71 is a method of making microoptical glazing comprising:
providing a transfer tape, the transfer tape comprising
 a first template having a structured surface,
 a curable backfill layer on the structured surface such that the curable backfill layer has a major surface conforming with the structured surface of the first template and an opposing microstructured surface comprising asymmetric structures; and
 a layer disposed on the microstructured surface of the cured backfill layer, wherein the layer has a different refractive index than the cured backfill layer;
applying an adhesive to the layer having a different refractive index than the cured backfill layer; and bonding the cured microstructured backfill layer to a pane of glass.

Embodiment 72 is a method of making microoptical glazing comprising:
providing a transfer tape, the transfer tape comprising
 a first template having a structured surface,
 a curable backfill layer on the structured surface such that the curable backfill layer has a major surface conforming with the structured surface of the first template and an opposing microstructured surface comprising asymmetric structures; and
 an adhesive layer disposed on the microstructured surface of the cured backfill layer, wherein the adhesive layer has a different refractive index than the cured backfill layer;
bonding the cured microstructured backfill layer to a pane of glass by means of the adhesive layer disposed on the microstructured surface of the backfill layer.

Embodiment 73 is a method of making transfer tape comprising:
providing a transfer tape, wherein the transfer tape comprises
 a first template having a structured surface and opposing surface,
 a cured backfill layer on the structured surface such that the backfill layer has a major surface conforming with the structured surface of the first template and an opposing surface comprising asymmetric microstructures;
 an adhesive layer disposed on the opposing surface of the backfill layer; and
 a release liner disposed on the adhesive layer;
cutting through the first template, backfill layer, and adhesive layer such that cut portions remain of the release liner and the uncut portion can be removed.

Embodiment 74 is the method of Embodiment 73, wherein the transfer tape is further characterized by any one or combination of Embodiments 1 to 31.

Embodiment 75 is a method of making a microoptical glazing comprising:
providing the transfer tape of Embodiment 73 or 74;
removing the release liner;
bonding the adhesive of the score cut portions to a pane of glass; and
removing the first template.

Embodiment 76 is the method of making a microoptical glazing of Embodiment 75, wherein the adhesive is index matched to the pane of glass.

Embodiment 77 is a method of making a microoptical glazing comprising:
providing a transfer tape, wherein the transfer tape comprises
 a first template having a structured surface and opposing surface,
 a cured backfill layer on the structured surface such that the backfill layer has a major surface conforming with the structured surface of the first template and an opposing surface;
providing a piece of glass having a roughened surface, the roughened surface having a slope distribution with a first half width at half maximum (HWHM) in a first direction and a second surface angle distribution having a second HWHM in a second direction different from the first direction, wherein the first HWHM is different from the second HWHM;
bonding the roughened surface of the glass to the opposing surface of the backfill layer with an adhesive, wherein the adhesive has substantially the same refractive index as the cured backfill layer and the adhesive has a different refractive index than the glass.

Embodiment 78 is a method of making a microoptical glazing comprising:
providing a transfer tape, wherein the transfer tape comprises
 a first template having a structured surface and opposing surface,
 a cured backfill layer on the structured surface such that the backfill layer has a major surface conforming with the structured surface of the first template and an opposing surface comprising asymmetric microstructures;
providing a piece of glass having a roughened surface and a planar surface;
bonding the planar surface of the glass to the backfill layer with an adhesive, wherein the adhesive has substantially the same refractive index as the cured backfill layer and the adhesive has substantially the same refractive index as the glass.

Embodiment 79 is the method of Embodiment 78 or 78, wherein the roughened surface of the glass comprises a microstructured coating.

Embodiment 80 is the method of Embodiment 79, wherein the microstructured coating is free of matte particles.

Embodiment 81 is a method of making a microoptical glazing according to any of the preceding Embodiments directed to methods of making a microoptical glazing, wherein the microoptical glazing is further characterized by any one or combination of Embodiments 32 to 51.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

EXAMPLES

Daylight Redirecting transfer films with embedded diffusers were prepared. These films were transferred to glass substrates for evaluation. These examples are merely for illustrative purposes only and are not meant to be limiting on the scope of the appended claims. All parts, percentages, ratios, etc. in the examples and the rest of the specification are by weight, unless noted otherwise.

Materials List

Comparative Example 1

Daylight Redirecting Microstructures with Microstructured Symmetric Embedded Diffuser on Glass Daylight Redirection Microstructured Template/Release Coated Film The supporting substrate used was a 3-mil (about 76 micrometers) biaxially-oriented PET film having an adhesion promoting primer coating comprising AP1. The replicating resin was a 75/25 blend of R1 and R2 with 0.5% photoinitator PI1. The replicating resin was applied to the PET substrate in a manner and rate such that the resin was evenly distributed across the region to be replicated. Replication of the resin was conducted at 30 fpm (9 m/min) on a tool heated to 125° F. (52° C.). The tool, having the same but complimentary shape as the desired daylight redirecting structure, had been previously fabricated using a diamond-turning process. The desired periodic structure comprised two peaks and four facets per period with one facet per side of the function. The peaks were rounded slightly as a result of the diamond-turning process. Further details have been

| Abbreviation | Source |
|---|---|
| R1 | Aliphatic urethane diacrylate commercially available from IGM Resins Charlotte, NC, as PHOTOMER 6210 |
| R2 | Hexanediol diacrylate commercially available from Sartomer Americas Exton, PA, as SR238 |
| R3 | Aliphatic urethane acrylate oligomer commercially available from Sartomer Americas Exton, PA, as CN2920 |
| R4 | Propoxylated neopentyl glycol diacrylate commercially available from Sartomer Americas Exton, PA, as SR9003 |
| R5 | Trimethylolpropane triacrylate commercially available from Sartomer Americas, Exton, PA, as SR351. |
| AP1 | Acrylic Primer available from Dow Chemical Company, Midland, MI, as RHOPLEX 3208. |
| PI1 | Photoinitiator commercially available from BASF Corp. Wyandotte, MI, as LUCRIN TPO |
| PI2 | Photoinitiator commercially available from BASF Corp. Florham Park, NJ, as IRGACURE 4265 |
| S1 | 1-methoxy-2-propanol commercially available from Dow Chemical Midland, MI, as DOWANOL PM |
| ADH1 | Silicone adhesive in ethyl acetate (an adhesive composition was prepared using the same proportions and same MQ resin as described in Example 1 of U.S. Pat. No. 7,947,376 but using the polymer solution described in U.S. Pat. No. 8,765,881 Example 12.) |
| NP1 | Surface treated zirconia particles, 60.2% solids in solvent. 62.8% of an A-174 methacryloxypropyl trimethoxysilane (available from Momentive Performance Materials Inc., Waterford, NY) surface treated 8 nm zirconia particle sol, 60.2% solids in methoxy propanol solvent (available as Dowanol PM from Dow Chemical Company, Midland, MI). The surface treated 8 nm zirconia (ZrO2) particle sol was produced as follows. An aqueous ZrO2 sol, like that produced during formation of U.S. Pat. No. 8,647,510 example 17, was first produced. This aqueous sol was concentrated to 31.75% ZrO2. The concentrated sol (400 grams) was charged to a 32 oz jar. 44.10 g of 3-(methacryloyloxy)-propyltrimethoxysilane (available from Alfa-Aesar, Ward Hill, MA), 400 g 1-methoxy-2-propanol (available as Dowanol PM from Dow Chemical Company, Midland, MI) and 0.15 g of 5 weight percent Prostab 5198 in water (Prostab 5198 available from BASF Corporation, Florham Park, NJ) were added to the sol in that order with stirring. The jar was sealed and heated to 90° C. for 16 hours. The resultant mixture (844.25 grams) was then precipitated as described below. A 2000 mL beaker was charged with DI water (1100 grams) and concentrated ammonia (25.20 grams, 29 wt % NH3). The above jar of surface modified ZrO2 was poured into the aqueous ammonia and stirred slowly for 10 minutes. This resulted in a white precipitate. The precipitate was isolated on a Buchner funnel (Whatman #4 filter paper). It was washed twice with 140 mL of DI water. The resultant damp solids were then dissolved in a 2000 mL beaker charged with 1-methoxy-2-propanol (1000 grams) and stirred to result in a translucent solution (about 10 weight percent solid). This sol was stripped to 50% solids and charged with 1-methoxy-2-propanol (400 g) and then concentrated to 60.2 weight percent solids. |
| D1 | Holographic Diffuser, available from Luminit, LLC, Torrance, CA, as L601P1-12 |
| D2 | Holographic Diffuser, available from Luminit, LLC, Torrance, CA, as L6010P1-12 | provided in U.S. Patent Application Ser. No. 62/094,626, entitled "OPTICAL STRUCTURES FOR REDIRECTING DAYLIGHT" which is hereby incorporated herein by reference to the extent that it does not contradict the present description. Radiation from a Fusion "D" lamp operating at 600 W/in (24 kW/m) was transmitted through the film to cure the resin while in contact with the tool. The replicated Daylight Redirection Microstructured Template Film (replicated resin on PET substrate) was then removed from the tool and wound into a roll in preparation for further processing.

To allow subsequent removal of materials cast into it, the replicated Daylight Redirection Microstructured Template Film was surface treated in a low pressure plasma chamber. After removal of the air from the chamber, perfluorohexane (C6F14) and oxygen were introduced to the chamber at flow rates of 600 and 300 sccm, respectively with a total chamber pressure of 300 mTorr. The film was treated with RF power of 3000 W as the film moved through the treatment zone at 40 ft/min (12 m/min). This formed the Daylight Redirection Microstructured Template/Release Coated Film.

Embedded Microstructured Symmetric Diffuser Template/Release Coated Film

A 3-mil (about 76 micrometers) biaxially-oriented PET film having an adhesion promoting primer coating comprising AP1 had the structure from a cylindrical replication tool replicated onto the film. This formed the Embedded Microstructured Symmetric Diffuser Template which was the diffuse interface between the light redirecting optics and adhesive (diffuser template). The cylindrical replication tool was made by the method used for the "First Tool" described in WO 2014/081693 (Pham et al.). The replicating resin was a 60/20/20 blend of R1, R2 and R5 with a photoinitator package comprising of 0.5% PI1. The replicating resin was applied to the PET film in a manner and rate such that the resin was evenly distributed across the region to be replicated. Replication of the resin was conducted at 100 fpm on a replication tool heated to 125° F. (52° C.). The replication tool, having the same but complimentary shape as the desired diffuser structure, had been previously fabricated using the process described in WO 2014/081693 (Pham et al.). Radiation from Fusion "D" lamps operating at 600 W/in (24 kW/m) was transmitted through the film to cure the resin while in contact with the tool. The Embedded Microstructured Symmetric Diffuser Template film (replicated resin and PET substrate) was then removed from the tool and wound into a roll in preparation for further processing. The Embedded Microstructured Symmetric Diffuser Template film was release treated in a low pressure plasma chamber to allow its removal after curing of the redirecting optics resin. After removal of the air from the chamber, perfluorohexane (C6F14) and oxygen were introduced to the chamber at flow rates of 600 and 300 sccm, respectively with a total chamber pressure of 300 mTorr. The film was treated with RF power of 3000 W as the film moved through the treatment zone at 40 ft/min (12 m/min). This formed the Embedded Microstructured Symmetric Diffuser Template/Release Coated Film.

Backfill Coated Daylight Redirection Microstructured Template/Release Film with Embedded Microstructured Symmetric Diffuse Interface Using a notch bar handspread coater, the Daylight Redirection Microstructured Template/Release Coated Film described above was backfilled 3 mil (about 76 micrometers) wet with a coating solution. The coating solution consisting of 13.5 g R3 and 3.4 g R4, 0.3 g PI1 29.0 g S1 and 53.8 g NP1. The coated Daylight Redirection Microstructured Template/Release Coated Film was then dried at 60° C. for 10 minutes to remove the solvent. The Embedded Microstructured Symmetric Diffuser Template/Release Coated Film described above was then laminated to the open surface of the coating using a bench size 2-roll laminator. The films were then cured using a continuous belt curing station and Fusion H-bulb at 100% power. Two passes were made at 50 ft/min (15 m/min).

Adhesive Coating

Figure 18:
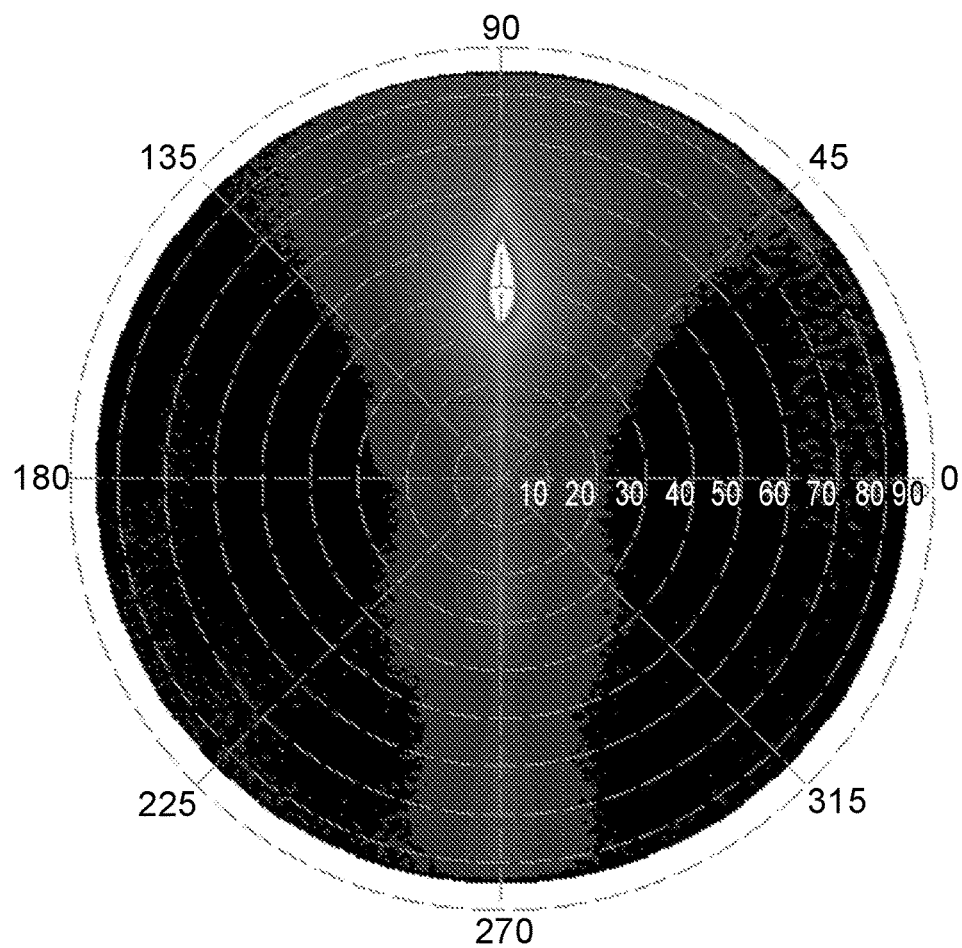
FIGS. 18-20 depicts bi-directional transmission distribution function (BTDF) plots for microoptical glazings.

The Embedded Microstructured Symmetric Diffuser Template/Release Coated Film was removed from the surface of the cured coating. On to the now diffuse surface of the coating was coated a 3 mil (about 76 micrometers) wet coating of a tackified silicone adhesive (ADH1) in ethyl acetate using a handspread notch bar coater. This was dried for 30 min at room temperature followed by 30 min at 70° C. in a convection oven to remove the solvent. Using a bench size 2-roll laminator, the entire construction was affixed to a 2"×3" (5.1 cm×7.6 cm) glass microscope slide, adhesive to glass. The Daylight Redirection Microstructured Template/Release Coated Film was then removed from the top of the laminate. This formed the Daylight Redirecting Microstructures with Microstructured Symmetric Embedded Diffuser on Glass. Using an imaging sphere in transmission mode (IS-SA made by Radiant Vision Systems, Redmond, Wash.), with incident light source at 45 degree vertical elevation, the Bidirectional Transmittance Distribution Function (BTDF) plot shown in FIG. 18 was generated.

Example 1

Daylight Redirecting Microstructures with Microstructured Asymmetric Embedded Diffuser on Glass Daylight Redirection Microstructured Template/Release Coated Film The Daylight Redirection Microstructured Template/Release Coated Film used in this Example was made in the same fashion as that used in Comparative Example 1.

Embedded Microstructured Asymmetric Diffuser Template/Release Coated Film

In this Example, the diffuser template was made from a sheet diffuser film D1. To allow subsequent removal of materials from the template, it was surface treated in a low pressure plasma chamber. After removal of the air from the chamber, the sample was cleaned using oxygen flowing at 200 sccm and RF power of 500 W for 30 seconds. This was followed by the release coating step using perfluorohexane (C6F14) flowing at 200 sccm and RF power of 1000 W for 90 seconds. Finally, the chamber containing the sample was purged with 500 sccm oxygen for 240 seconds. This formed the Embedded Microstructured Asymmetric Diffuser Template/Release Coated Film.

Backfill Coated Daylight Redirection Microstructured Template/Release Film with Embedded Microstructured Asymmetric Diffuse Interface The backfill coating and drying in this Example was done in the same fashion as that used in Comparative Example 1 above. The Embedded Microstructured Asymmetric Diffuser Template/Release Coated Film described above was then laminated to the open surface of the coating using a bench size 2-roll laminator. Before lamination, the diffuser template was oriented such that the axis with widest angle of diffusion was parallel to the prisms of the Daylight Redirection Microstructured Template. The films were then cured using a continuous belt curing station and Fusion H-bulb at 100% power. Two passes were made at 50 ft/min (15 m/min).

Adhesive Coating

Figure 19:
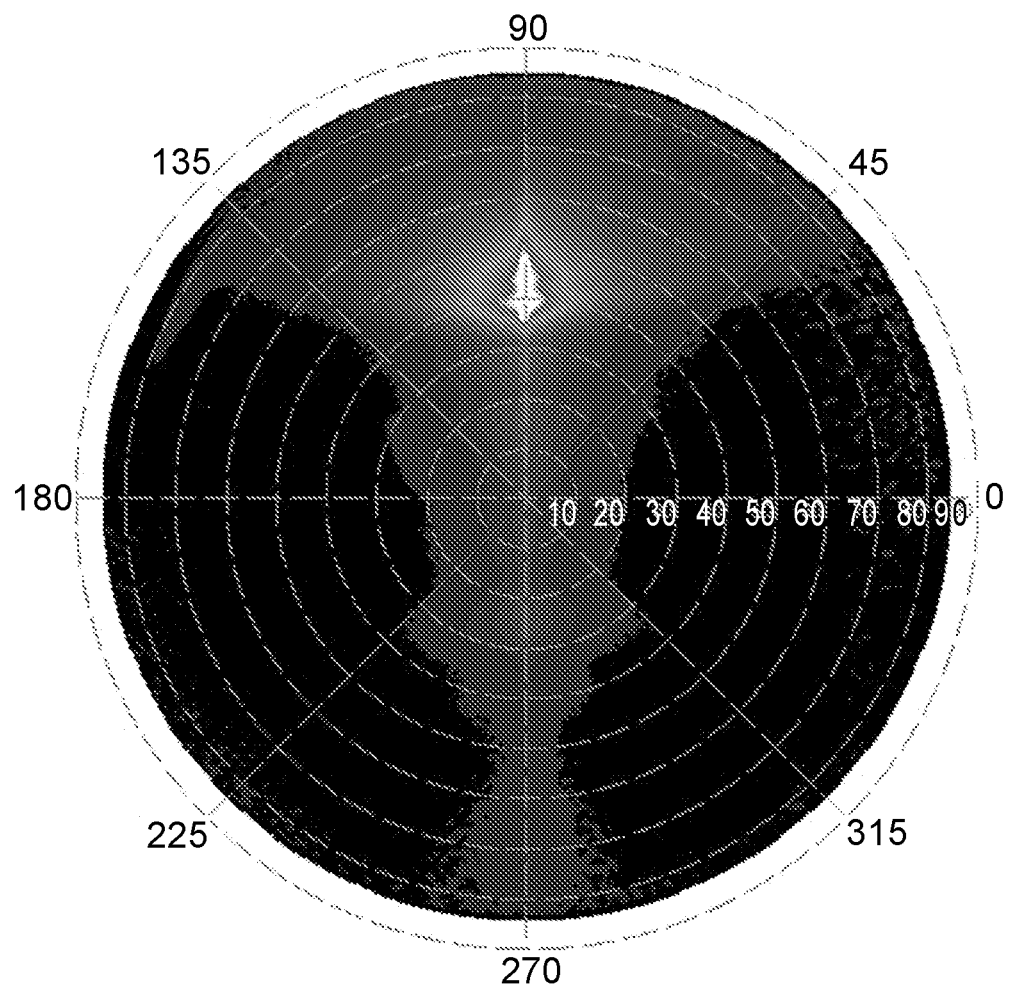

The adhesive coating and lamination to glass microscope slide was done in the same fashion as described in Comparative Example 1. Using an imaging sphere in transmission mode (IS-SA made by Radiant Vision Systems, Redmond, Wash.), with incident light source at 45 degree vertical elevation, the Bidirectional Transmittance Distribution Function (BTDF) plot shown in FIG. 19 was generated.

Example 2

Daylight Redirecting Microstructures with Microstructured Asymmetric Embedded Diffuser on Glass Daylight Redirection Microstructured Template/Release Coated Film The Daylight Redirection Microstructured Template/Release Coated Film used in this Example was made in the same fashion as that used in Comparative Example 1.

Embedded Microstructured Asymmetric Diffuser Template/Release Coated Film

In this Example, the diffuser template was made from a sheet of diffuser film D2. To allow subsequent removal of materials from the template, it was surface treated in a low pressure plasma chamber. After removal of the air from the chamber, the sample was cleaned using oxygen flowing at 200 sccm and RF power of 500 W for 30 seconds. This was followed by the release coating step using perfluorohexane (C6F14) flowing at 200 sccm and RF power of 1000 W for 90 seconds. Finally, the chamber containing the sample was purged with 500 sccm oxygen for 240 seconds. This formed the Embedded Microstructured Asymmetric Diffuser Template/Release Coated Film.

Backfill Coated Daylight Redirection Microstructured Template/Release Film with Embedded Microstructured Asymmetric Diffuse Interface The backfill coating and drying in this Example was done in the same fashion as that used in Comparative Example 1 above. The Embedded Microstructured Asymmetric Diffuser Template/Release Coated Film described above was then laminated to the open surface of the coating using a bench size 2-roll laminator. Before lamination, the diffuser template was oriented such that the axis with widest angle of diffusion was parallel to the prisms of the Daylight Redirection Microstructured Template. The films were then cured using a continuous belt curing station and Fusion H-bulb at 100% power. Two passes were made at 50 ft/min (15 m/min).

Adhesive Coating

Figure 20:
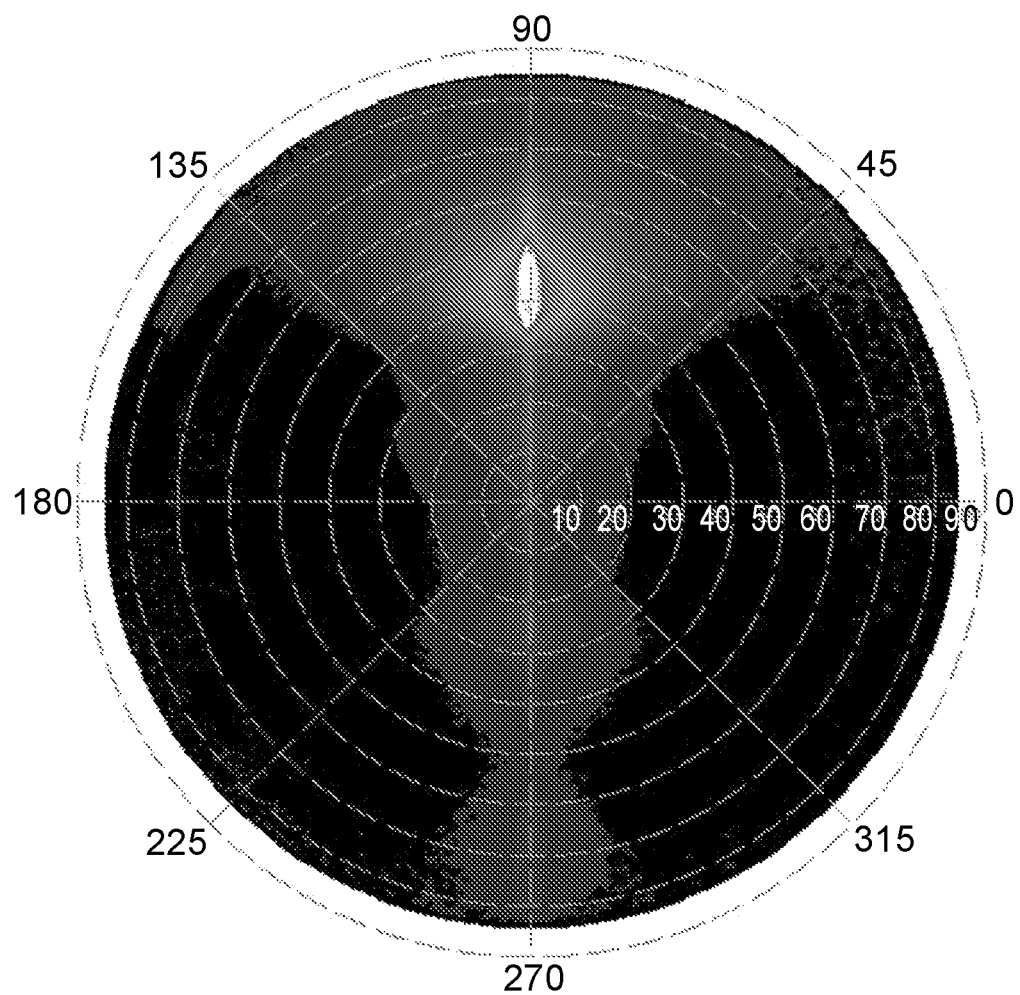

The adhesive coating and lamination to glass microscope slide was done in the same fashion as described in Comparative Example 1. Using an imaging sphere in transmission mode (IS-SA made by Radiant Vision Systems, Redmond, Wash.), with incident light source at 45 degree vertical elevation, the Bidirectional Transmittance Distribution Function (BTDF) plot shown in FIG. 20 was generated.

What is claimed is:

1. A transfer tape, comprising:
   a removable template layer having a structured surface;
   a backfill layer having a first surface disposed on at least a portion of the structured surface of the template layer, and a second surface opposite the structured surface wherein the second surface comprises a microstructured surface;
   a layer disposed on at least a portion of the microstructured surface, wherein the layer has a refractive index that differs from the backfill layer,
   wherein the microstructured surface together with the layer disposed on at least a portion of the microstructured surface is an anisotropic diffuser.

2. The transfer tape of claim 1, wherein the diffuser has an optical haze of 20 to 85 percent and an optical clarity of no more than 50 percent.

3. The transfer tape of claim 1, wherein the diffuser has an optical haze of 25 to 65 percent and an optical clarity of 7 to 37 percent.

4. The transfer tape of claim 1, wherein the backfill layer has a first refractive index, the layer has a second refractive index, and the first refractive index is higher than the second refractive index by at least 0.05.

5. The transfer tape of claim 1, wherein the microstructured surface has a surface angle distribution having a first half width at half maximum (HWHM) in a first direction and a second surface angle distribution having a second HWHM in a second direction different from the first direction, wherein the first HWHM is different from the second HWHM.

6. The transfer tape of claim 1, wherein the layer comprises an adhesive.

7. The transfer tape of claim 6, wherein the adhesive comprises a polydiorganosiloxane polyoxamide copolymer.

8. The transfer tape of claim 1, wherein the backfill layer comprise a polysiloxane material.

9. A microoptical glazing comprising:
   a pane of glass having a major surface;
   a microoptical layer bonded to at least a portion of the major surface, the microoptical layer comprising a cured backfill layer wherein the microoptical layer has a structured surface and opposing microstructured surface, and a layer adjacent the microstructured surface having a refractive index that differs from the backfill layer,
   wherein the microstructured surface together with the layer adjacent the microstructured surface is an anisotropic diffuser.

10. The microoptical glazing of claim 9, wherein the layer adjacent the microstructured surface is an adhesive and the adhesive bonds the microoptical layer to the major surface of the pane of glass.

11. The microoptical glazing of claim 9, wherein there is no organic polymeric film substrate between the microoptical layer and the pane of glass.

12. A microoptical glazing comprising:
   a pane of glass having a major surface;
   a microoptical layer bonded to at least a portion of the major surface, and
   a microstructured interface adjacent a layer having a refractive index different than a refractive index of the microoptical layer, the microstructured interface proximate the microoptical layer;
   wherein for an input angle ranging from 30° to 60° the microoptical glazing redirects upwards at least 80% of daylight and does not exhibit a solar column, and
   wherein the microstructured interface comprises asymmetric structures and is adapted to anisotropically diffuse visible light.

13. The microoptical glazing of claim 12, wherein the microstructured interface has an optical haze of 20 to 85 percent and an optical clarity of no more than 50 percent.

14. The microoptical glazing of claim 12, wherein the microstructured interface has an optical haze of 30 to 60 percent and an optical clarity of 10 to 35 percent.

15. The microoptical glazing of claim 12, wherein the microstructured interface has a surface angle distribution having a first half width at half maximum (HWHM) in a first direction and a second surface angle distribution having a second HWHM in a second direction different from the first direction, wherein the first HWHM is different from the second HWHM.

16. The microoptical glazing of claim 15, wherein a ratio of the first HWHM to the second HWHM is greater than 1.1 and less than about 10.

17. An insulated glazing unit, comprising:
   a pane of glass having a sun-facing exterior surface separated by a gap from a pane of glass having a room-facing exterior surface, each pane having an interior surface adjacent the gap; and
   a microoptical layer bonded to at least a portion of an interior surface of a pane of glass, the microoptical layer comprising a cured backfill layer, wherein the microoptical layer has a structured surface and an opposing microstructured surface adjacent a layer having a refractive index that differs from the backfill layer, wherein the microstructured surface together with the layer is an anisotropic diffuser.

18. The insulated glazing unit of claim 17, wherein the layer adjacent the microstructured surface is an adhesive and the adhesive bonds the microoptical layer to the interior surface of the pane of glass.

19. The insulated glazing unit of claim 17, wherein the anisotropic diffuser has an optical haze of 20 to 85 percent and an optical clarity of no more than 50 percent.

20. The insulated glazing unit of claim 17, wherein the anisotropic diffuser has an optical haze of 30 to 60 percent and an optical clarity of 10 to 35 percent.

21. An insulated glazing unit, comprising
   a pane of glass having a sun-facing exterior surface separated by a gap from a pane of glass having a room-facing exterior surface, each pane having an interior surface adjacent the gap; and
   a microoptical layer disposed on an interior surface of the insulated glazing unit; and
   a microstructured interface disposed between the microoptical layer and the room-facing exterior surface, the microstructured interface comprising asymmetric structures, wherein the microstructured interface is adapted to anisotropically diffuse visible light.

22. The insulated glazing unit of claim 21, wherein the microoptical layer has a structured surface and an opposing planar surface, wherein the planar surface is bonded to an interior sun-facing surface of a pane of glass with an adhesive.

23. The insulated glazing unit of claim 21, wherein the microoptical layer has a structured surface and an opposing planar surface and the microstructured interface is disposed on the room-facing exterior surface of the pane of glass.

24. The insulated glazing unit of claim 21, wherein there is no organic polymeric film substrate between the microoptical layer and the pane of glass.

* * * * *

UNITED STATES PATENT AND TRADEMARK OFFICE
CERTIFICATE OF CORRECTION

PATENT NO. : 10,656,312 B2
APPLICATION NO. : 15/737362
DATED : May 19, 2020
INVENTOR(S) : Justin Meyer et al.

It is certified that error appears in the above-identified patent and that said Letters Patent is hereby corrected as shown below:

In the Specification

Column 12
Line 48, after "$S_y=\partial H(x,y)/\partial y$" insert -- . --.

Column 28
Line 32, delete "scanning" and insert -- scanning. --, therefor.

Column 37
Line 52, delete "(C6F14)" and insert -- $(C_6F_{14})$ --, therefor.

Signed and Sealed this
Twenty-seventh Day of October, 2020

Andrei Iancu
*Director of the United States Patent and Trademark Office*